(12) United States Patent
Kashiwazaki et al.

(10) Patent No.: US 11,038,208 B2
(45) Date of Patent: *Jun. 15, 2021

(54) NONAQUEOUS ELECTROLYTE SECONDARY BATTERY

(71) Applicant: Sumitomo Chemical Company, Limited, Tokyo (JP)

(72) Inventors: Eiko Kashiwazaki, Osaka (JP); Toshihiko Ogata, Osaka (JP); Kosuke Kurakane, Osaka (JP); Ichiro Arise, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 56 days.

This patent is subject to a terminal disclaimer.

(21) Appl. No.: 16/224,014

(22) Filed: Dec. 18, 2018

(65) Prior Publication Data

US 2019/0190072 A1 Jun. 20, 2019

(30) Foreign Application Priority Data

Dec. 19, 2017 (JP) .............................. JP2017-243280

(51) Int. Cl.
*H01M 10/0585* (2010.01)
*H01M 10/48* (2006.01)
(Continued)

(52) U.S. Cl.
CPC ......... *H01M 10/0585* (2013.01); *H01M 4/13* (2013.01); *H01M 4/131* (2013.01);
(Continued)

(58) Field of Classification Search
CPC ...... H01M 2/16; H01M 2/1686; H01M 4/525; H01M 4/583; H01M 50/409; H01M 50/449
See application file for complete search history.

(56) References Cited

U.S. PATENT DOCUMENTS 3,931,446 A 1/1976 Murayama et al.
4,923,650 A 5/1990 Antoon, Jr. et al.
(Continued)

FOREIGN PATENT DOCUMENTS

CN 1041167 A 4/1990
CN 1322021 A 11/2001
(Continued)

OTHER PUBLICATIONS

Office Action dated Apr. 3, 2018 in JP Application 2017-243280 (Partial English Translation).
(Continued)

*Primary Examiner* — Amanda C. Walke
(74) *Attorney, Agent, or Firm* — Panitch Schwarze Belisario & Nadel LLP

(57) ABSTRACT

A nonaqueous electrolyte secondary battery includes: a separator including a polyolefin porous film; a porous layer containing a polyvinylidene fluoride-based resin; a positive electrode plate having a capacitance falling within a specific range; and a negative electrode plate having a capacitance falling within a specific range. The polyolefin porous film has a given piercing strength, having a value of not less than 0.00 and not more than 0.54, the value being represented by the following expression: |1−T/M|, where T and M are distances at which a critical load is reached in a scratch test in which the polyolefin porous film is moved in transverse and machine directions, respectively, under a constant load of 0.1N. The polyvinylidene fluoride-based resin contains an α-form polyvinylidene fluoride-based resin in an amount of not less than 35.0 mol %.

6 Claims, 3 Drawing Sheets

(51) Int. Cl.
- *H01M 10/0525* (2010.01)
- *H01M 4/583* (2010.01)
- *H01M 4/131* (2010.01)
- *H01M 4/133* (2010.01)
- *H01M 4/48* (2010.01)
- *H01M 4/13* (2010.01)
- *H01M 10/05* (2010.01)
- *H01M 4/525* (2010.01)
- *H01M 50/409* (2021.01)
- *H01M 50/449* (2021.01)

(52) U.S. Cl.
CPC ............ *H01M 4/133* (2013.01); *H01M 4/48* (2013.01); *H01M 4/525* (2013.01); *H01M 4/583* (2013.01); *H01M 10/05* (2013.01); *H01M 10/0525* (2013.01); *H01M 10/48* (2013.01); *H01M 50/409* (2021.01); *H01M 50/449* (2021.01)

(56) References Cited

U.S. PATENT DOCUMENTS

| | | | |
|---|---|---|---|
| 5,008,296 A | 4/1991 | Antoon, Jr. et al. | |
| 5,011,698 A | 4/1991 | Antoon, Jr. et al. | |
| 5,051,183 A | 9/1991 | Takita et al. | |
| 5,571,634 A | 11/1996 | Gozdz et al. | |
| 6,395,419 B1 | 5/2002 | Kuwahara et al. | |
| 7,208,555 B2 | 4/2007 | Tada et al. | |
| 7,255,957 B2 | 8/2007 | Takahashi et al. | |
| 8,931,647 B2* | 1/2015 | Shiki | C08J 5/18 210/500.42 |
| 9,508,975 B1 | 11/2016 | Matsuo | |
| 9,876,210 B2 | 1/2018 | Ogata et al. | |
| 10,074,840 B2 | 9/2018 | Honda et al. | |
| 10,319,973 B2 | 6/2019 | Ogata et al. | |
| 10,361,418 B2 | 7/2019 | Ogata et al. | |
| 10,361,458 B2 | 7/2019 | Ogata et al. | |
| 10,367,182 B2 | 7/2019 | Ogata et al. | |
| 10,388,932 B2 | 8/2019 | Ogata et al. | |
| 10,461,297 B2 | 10/2019 | Ogata et al. | |
| 10,707,517 B2* | 7/2020 | Arise | H01M 2/1686 |
| 2002/0018936 A1 | 2/2002 | Suzuki et al. | |
| 2002/0136887 A1 | 9/2002 | Penneau et al. | |
| 2003/0031924 A1 | 2/2003 | Lee et al. | |
| 2003/0157314 A1 | 8/2003 | Penneau et al. | |
| 2003/0175494 A1 | 9/2003 | Penneau et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2009/0148685 A1 | 6/2009 | Kang et al. | |
| 2009/0200509 A1 | 8/2009 | Suzuki et al. | |
| 2010/0009265 A1 | 1/2010 | Hatayama et al. | |
| 2010/0123096 A1 | 5/2010 | Suzuki | |
| 2010/0167125 A1 | 7/2010 | Miyaki et al. | |
| 2010/0208177 A1 | 8/2010 | Kobayashi et al. | |
| 2010/0285341 A1 | 11/2010 | Yun et al. | |
| 2011/0027660 A1 | 2/2011 | Takeda et al. | |
| 2011/0212358 A1 | 9/2011 | Usami et al. | |
| 2011/0293989 A1 | 12/2011 | Hasegawa et al. | |
| 2011/0305940 A1 | 12/2011 | Usami et al. | |
| 2012/0028101 A1 | 2/2012 | Ishihara et al. | |
| 2012/0028102 A1 | 2/2012 | Ishihara et al. | |
| 2012/0028131 A1 | 2/2012 | Ishihara et al. | |
| 2012/0034518 A1 | 2/2012 | Ishihara et al. | |
| 2012/0034519 A1 | 2/2012 | Ishihara et al. | |
| 2012/0035285 A1 | 2/2012 | Noumi et al. | |
| 2012/0040232 A1 | 2/2012 | Ishihara et al. | |
| 2012/0135305 A1* | 5/2012 | Kim | H01M 4/1391 429/211 |
| 2012/0268072 A1 | 10/2012 | Okuno | |
| 2012/0308898 A1 | 12/2012 | Sawamoto et al. | |
| 2013/0071743 A1 | 3/2013 | Miyaki et al. | |
| 2013/0089770 A1 | 4/2013 | Nishikawa | |
| 2013/0089772 A1 | 4/2013 | Nishikawa | |
| 2013/0095365 A1 | 4/2013 | Nishikawa | |
| 2013/0164618 A1 | 6/2013 | Konishi | |
| 2013/0196208 A1 | 8/2013 | Nemoto | |
| 2013/0252056 A1 | 9/2013 | Ueki et al. | |
| 2013/0266831 A1 | 10/2013 | Motohashi et al. | |
| 2013/0319599 A1 | 12/2013 | Huang | |
| 2013/0337311 A1 | 12/2013 | Itou | |
| 2014/0050965 A1 | 2/2014 | Ha et al. | |
| 2014/0178741 A1 | 6/2014 | Hasegawa et al. | |
| 2014/0272505 A1 | 9/2014 | Yoon et al. | |
| 2014/0363726 A1 | 12/2014 | Honda et al. | |
| 2014/0377630 A1 | 12/2014 | Kawakami et al. | |
| 2015/0093647 A1* | 4/2015 | Kako | H01M 4/505 429/223 |
| 2015/0155541 A1 | 6/2015 | Hasegawa | |
| 2015/0180002 A1 | 6/2015 | Nishikawa et al. | |
| 2015/0188108 A1 | 7/2015 | Miyazawa et al. | |
| 2015/0236323 A1 | 8/2015 | Honda et al. | |
| 2015/0263325 A1 | 9/2015 | Honda et al. | |
| 2015/0280194 A1 | 10/2015 | Mitsuoka et al. | |
| 2015/0349312 A1 | 12/2015 | Ha et al. | |
| 2015/0372276 A1 | 12/2015 | Mizuno et al. | |
| 2016/0036027 A1 | 2/2016 | Nishikawa | |
| 2016/0118639 A1 | 4/2016 | Ishihara | |
| 2016/0181584 A1 | 6/2016 | Hatayama et al. | |
| 2016/0181593 A1 | 6/2016 | Jin et al. | |
| 2016/0233553 A1 | 8/2016 | Yamasaki et al. | |
| 2016/0268571 A1 | 9/2016 | Honda | |
| 2017/0012265 A1 | 1/2017 | Nakadate et al. | |
| 2017/0033347 A1 | 2/2017 | Murakami et al. | |
| 2017/0033348 A1 | 2/2017 | Murakami et al. | |
| 2017/0098809 A1* | 4/2017 | Ogata | H01M 2/1653 |
| 2017/0141373 A1 | 5/2017 | Murakami et al. | |
| 2017/0155113 A1* | 6/2017 | Hashiwaki | H01M 2/1686 |
| 2017/0155114 A1 | 6/2017 | Kurakane | |
| 2017/0155120 A1 | 6/2017 | Yoshimaru et al. | |
| 2017/0155121 A1 | 6/2017 | Ogata | |
| 2017/0162849 A1 | 6/2017 | Murakami et al. | |
| 2017/0170443 A1 | 6/2017 | Murakami et al. | |
| 2017/0263905 A1 | 9/2017 | Ogata et al. | |
| 2017/0279102 A1 | 9/2017 | Hasegawa et al. | |
| 2017/0341035 A1 | 11/2017 | Sato et al. | |
| 2017/0365831 A1 | 12/2017 | Ogata et al. | |
| 2017/0365832 A1 | 12/2017 | Ogata et al. | |
| 2017/0365833 A1 | 12/2017 | Ogata et al. | |
| 2017/0365834 A1 | 12/2017 | Ogata et al. | |
| 2017/0365835 A1 | 12/2017 | Ogata et al. | |
| 2017/0365836 A1 | 12/2017 | Ogata et al. | |
| 2017/0365878 A1 | 12/2017 | Ogata et al. | |
| 2018/0013118 A1 | 1/2018 | Kawakami et al. | |
| 2018/0083249 A1 | 3/2018 | Hasegawa et al. | |
| 2018/0261878 A1* | 9/2018 | Azami | H01M 4/661 |
| 2018/0301740 A1* | 10/2018 | Min | H01M 4/131 |
| 2018/0342720 A1 | 11/2018 | Kurakane | |
| 2019/0074539 A1* | 3/2019 | Shen | H01M 4/626 |
| 2019/0189993 A1 | 6/2019 | Arise et al. | |
| 2019/0190037 A1* | 6/2019 | Mizuno | H01M 2/16 |
| 2019/0334149 A1* | 10/2019 | Li | H01M 2/1653 |
| 2019/0386274 A1* | 12/2019 | Wood | H01M 2/145 |
| 2019/0393466 A1* | 12/2019 | Lin | H01M 2/1653 |
| 2020/0052269 A1* | 2/2020 | Taguchi | H01M 2/145 |
| 2020/0070470 A1 | 3/2020 | Yoshimaru et al. | |

FOREIGN PATENT DOCUMENTS

| | | | |
|---|---|---|---|
| CN | 1362892 A | 8/2002 | |
| CN | 1825666 A | 8/2006 | |
| CN | 1933923 A | 3/2007 | |
| CN | 101500696 A | 8/2009 | |
| CN | 101516975 A | 8/2009 | |
| CN | 101836138 A | 9/2010 | |
| CN | 101983219 A | 3/2011 | |
| CN | 102307944 A | 1/2012 | |
| CN | 102339965 A | 2/2012 | |

(56) References Cited

FOREIGN PATENT DOCUMENTS

| | | |
|---|---|---|
| CN | 102372856 A | 3/2012 |
| CN | 102651466 A | 8/2012 |
| CN | 103155219 A | 6/2013 |
| CN | 103155220 A | 6/2013 |
| CN | 103474601 A | 12/2013 |
| CN | 103477491 A | 12/2013 |
| CN | 104051776 A | 9/2014 |
| CN | 104241574 A | 12/2014 |
| CN | 105322120 A | 2/2016 |
| EP | 0834941 A1 | 4/1998 |
| JP | S51017274 A | 2/1976 |
| JP | H06104736 B2 | 12/1994 |
| JP | H9161778 A | 6/1997 |
| JP | H11016561 A | 1/1999 |
| JP | H11040129 A | 2/1999 |
| JP | H1186844 A | 3/1999 |
| JP | H11120994 A | 4/1999 |
| JP | H11130900 A | 5/1999 |
| JP | H11300180 A | 11/1999 |
| JP | 2001118558 A | 4/2001 |
| JP | 2001351616 A | 12/2001 |
| JP | 2002265658 A | 9/2002 |
| JP | 2004087209 A | 3/2004 |
| JP | 2005135659 A | 5/2005 |
| JP | 2005179562 A | 7/2005 |
| JP | 2005200623 A | 7/2005 |
| JP | 2005222773 A | 8/2005 |
| JP | 2005343957 A | 12/2005 |
| JP | 200666243 A | 3/2006 |
| JP | 2007048581 A | 2/2007 |
| JP | 2008062229 A | 3/2008 |
| JP | 2008123996 A | 5/2008 |
| JP | 4247027 B2 | 4/2009 |
| JP | 2009104967 A | 5/2009 |
| JP | 2009185093 A | 8/2009 |
| JP | 2009218198 A | 9/2009 |
| JP | 2009256404 A | 11/2009 |
| JP | 2009259605 A | 11/2009 |
| JP | 2010118312 A | 5/2010 |
| JP | 2010157361 A | 7/2010 |
| JP | 2010232088 A | 10/2010 |
| JP | 2010540744 A | 12/2010 |
| JP | 2011077014 A | 4/2011 |
| JP | 4773064 B2 | 9/2011 |
| JP | 201276255 A | 4/2012 |
| JP | 2012104422 A | 5/2012 |
| JP | 2012150972 A | 8/2012 |
| JP | 5085581 B2 | 11/2012 |
| JP | 2012227066 A | 11/2012 |
| JP | 2012256528 A | 12/2012 |
| JP | 5164296 B2 | 3/2013 |
| JP | 2013046998 A | 3/2013 |
| JP | 2013171629 A | 9/2013 |
| JP | 5302456 B1 | 10/2013 |
| JP | 2013218875 A | 10/2013 |
| JP | 5355823 B1 | 11/2013 |
| JP | 2013234263 A | 11/2013 |
| JP | 5432417 B2 | 3/2014 |
| JP | 5553165 B2 | 7/2014 |
| JP | 2014213500 A | 11/2014 |
| JP | 2015111461 A | 6/2015 |
| JP | 2015120835 A | 7/2015 |
| JP | 2015122234 A | 7/2015 |
| JP | 5876616 B1 | 3/2016 |
| JP | 2016040354 A | 3/2016 |
| JP | 2016051695 A | 4/2016 |
| JP | 2016066755 A | 4/2016 |
| JP | 201671969 A | 5/2016 |
| JP | 5932161 B1 | 6/2016 |
| JP | 6012838 B1 | 10/2016 |
| JP | 6025957 B1 | 11/2016 |
| JP | 6153992 B2 | 6/2017 |
| JP | 2017103041 A | 6/2017 |
| JP | 2017103042 A | 6/2017 |
| JP | 2017103046 A | 6/2017 |
| JP | 2017103204 A | 6/2017 |
| JP | 2017103209 A | 6/2017 |
| JP | 2017107848 A | 6/2017 |
| JP | 2017142917 A | 8/2017 |
| JP | 2017168419 A | 9/2017 |
| JP | 2017226117 A | 12/2017 |
| JP | 2017226120 A | 12/2017 |
| JP | 2017226121 A | 12/2017 |
| JP | 2017226122 A | 12/2017 |
| JP | 2017228404 A | 12/2017 |
| KR | 20060072065 A | 6/2006 |
| KR | 20060101541 A | 9/2006 |
| KR | 20060118668 A | 11/2006 |
| KR | 20090037552 A | 4/2009 |
| KR | 20120003864 A | 1/2012 |
| KR | 20120128612 A | 11/2012 |
| KR | 20130031319 A | 3/2013 |
| KR | 20130036043 A | 4/2013 |
| KR | 101430975 B1 | 8/2014 |
| KR | 20140112668 A | 9/2014 |
| KR | 20140113186 A | 9/2014 |
| KR | 20140114428 A | 9/2014 |
| KR | 101479749 B1 | 1/2015 |
| KR | 20150020667 A | 2/2015 |
| KR | 20150032555 A | 3/2015 |
| KR | 101510972 B1 | 4/2015 |
| KR | 20150083839 A | 7/2015 |
| KR | 20150119836 A | 10/2015 |
| KR | 20160002173 A | 1/2016 |
| KR | 20160014616 A | 2/2016 |
| KR | 20160016805 A | 2/2016 |
| KR | 20160038918 A | 4/2016 |
| KR | 20160094846 A | 8/2016 |
| KR | 20170031794 A | 3/2017 |
| TW | 201523980 A | 6/2015 |
| WO | 9859384 A1 | 12/1998 |
| WO | 2007119850 A1 | 10/2007 |
| WO | 2008018181 A1 | 2/2008 |
| WO | 2010089939 A1 | 8/2010 |
| WO | 2012090632 A1 | 7/2012 |
| WO | 2012137375 A1 | 10/2012 |
| WO | 2013073503 A1 | 5/2013 |
| WO | 2013099539 A1 | 7/2013 |
| WO | 2013133074 A1 | 9/2013 |
| WO | 2015099190 A1 | 7/2015 |
| WO | 2015141477 A1 | 9/2015 |
| WO | 2016104792 A1 | 6/2016 |
| WO | 2016152863 A1 | 9/2016 |

OTHER PUBLICATIONS

International Search Report dated Jan. 10, 2017 in International Application No. PCT/JP2016/081481.
Martins et al., "Electroactive Phases of Poly(Vinylidene Fluoride): Determination, Processing, and Applications," Progress in Polymer Science, vol. 39, pp. 683-706 (2014).
Mohammadi et al., "Effect of Tensile Strain Rate and Elongation on Crystalline Structure and Piezoelectric Properties of PVDF Thin Films" Polymer Testing, vol. 26, pp. 42-50 (2007).
Office Action dated Jan. 13, 2020 in U.S. Appl. No. 15/989,901, by Kurakane.
Office Action dated Mar. 12, 2019 in JP Application No. 2017243278 (Partial English Translation).
Office Action dated Mar. 12, 2019 in JP Application No. 2017243282 (Partial English Translation).
Office Action dated Mar. 12, 2019 in JP Application No. 2017243286 (Partial English Translation).
Office Action dated Mar. 28, 2018 in CN Application No. 201610865635.7.
Office Action dated Apr. 3, 2018 in JP Application No. 2017243277 (Partial English Translation).
Office Action dated Apr. 3, 2018 in JP Application No. 2017243278 (Partial English Translation).
Office Action dated Apr. 3, 2018 in JP Application No. 2017243282.
Office Action dated Apr. 3, 2018 in JP Application No. 2017243284 (Partial English Translation).

(56) References Cited

OTHER PUBLICATIONS

Office Action dated Apr. 3, 2018 in JP Application No. 2017243286 (Partial English Translation).
Office Action dated Apr. 3, 2018 in JP Application No. 2017243289.
Office Action dated Apr. 3, 2018 in JP Application No. 2017243292 (Partial English Translation).
Office Action dated Apr. 10, 2018 in JP Application No. 2017243290 (Partial English Translation).
Office Action dated Apr. 10, 2018 in JP Application No. 2017243293.
Office Action dated Apr. 10, 2019 in U.S. Appl. No. 15/627,585, by Ogata.
Office Action dated Apr. 19, 2017 in KR Application No. 1020160077240.
Office Action dated May 16, 2017 in JP Application No. 2017033720 (Partial English Translation).
Office Action dated Jun. 10, 2020 in U.S. Appl. No. 16/223,737, by Arise.
Office Action dated Jun. 15, 2017 in U.S. Appl. No. 15/398,231, by Ogata.
Office Action dated Jun. 19, 2018 in KR Application No. 1020180060097.
Office Action dated Jun. 28, 2016 in JP Application No. 2016024163 (Partial English Translation).
Office Action dated Jul. 29, 2016 in KR Application No. 1020160077240.
Office Action dated Aug. 4, 2020 in U.S. Appl. No. 16/224,111, by Arise.
Office Action dated Aug. 6, 2020 in U.S. Appl. No. 16/224,785, by Kurkane.
Office Action dated Aug. 13, 2020 in U.S. Appl. No. 16/224,788, by Arise.
Office Action dated Aug. 18, 2017 in KR Application No. 1020170041366.
Office Action dated Aug. 18, 2017 in KR Application No. 1020170041590.
Office Action dated Aug. 18, 2017 in KR Application No. 1020170041595.
Office Action dated Aug. 18, 2017 in KR Application No. 1020170041604.
Office Action dated Aug. 18, 2017 in KR Application No. 1020170041611.
Office Action dated Aug. 23, 2016 in JP Application No. 2016127005.
Office Action dated Aug. 29, 2019 in KR Application No. 1020197013298 (Partial English Translation).
Office Action dated Aug. 30, 2017 in CN Application No. 201611225799.X.
Office Action dated Sep. 20, 2018 in U.S. Appl. No. 15/627,629, by Ogata.
Office Action dated Sep. 28, 2016 in KR Application No. 1020160087266.
Office Action dated Oct. 2, 2018 in JP Application No. 2017243278 (Partial English Translation).
Office Action dated Oct. 2, 2018 in JP Application No. 2017243282.
Office Action dated Oct. 2, 2018 in JP Application No. 2017243286 (Partial English Translation).
Office Action dated Oct. 2, 2018 in JP Application No. 2017243289.
Office Action dated Oct. 2, 2018 in JP Application No. 2017243290 (Partial English Translation).
Office Action dated Oct. 22, 2018 in U.S. Appl. No. 15/627,556, by Ogata.
Office Action dated Oct. 22, 2018 in U.S. Appl. No. 15/627,664, by Ogata.
Office Action dated Oct. 22, 2018 in U.S. Appl. No. 15/627,671, by Ogata.
Office Action dated Oct. 24, 2018 in U.S. Appl. No. 15/627,804, by Ogata.
Office Action dated Nov. 29, 2016 in JP Application No. 2016024163 (Partial English Translation).
Office Action dated Dec. 6, 2016 in JP Application No. 2016127005.
Office Action dated Dec. 20, 2018 in U.S. Appl. No. 15/627,585, by Ogata.
Office Action dated Dec. 21, 2016 in KR Application No. 1020160077240.
Office Action dated Dec. 30, 2019 in U.S. Appl. No. 16/223,737, by Arise.
Office Action dated Dec. 31, 2018 in U.S. Appl. No. 15/627,736, by Ogata.
Solvay, "Solef PVDF, Design & Processing Guide," pp. 1-64 (2015).
Written Opinion dated Jan. 10, 2017 in International Application No. PCT/JP2016/081481.
Kawanishi, K., "Effect of Crystalline Forms of Polyvinylidene fluoride (PVDF) on PVDF Resin Coated Steel Sheet Bendability," The Journal of the Surface Finishing Society of Japan, vol. 48, No. 8, pp. 811-814 (1997).
Obata, J., "Scratch Tester" Technical Sheet No. 13011, Japan, Technology Research Institute of Osaka Prefecture, p. 1-2 (2013).
Office Action dated Aug. 18, 2020 in JP Application No. 2019108158 (with Partial English Translation).
Office Action dated Sep. 23, 2020 in JP Application No. 2016123055 (Partial English Translation).
Office Action dated Jan. 21, 2021 in U.S. Appl. No. 16/224,767, by Kurakane.
Office Action dated Jan. 21, 2021 in U.S. Appl. No. 16/224,777, by Kurakane.
Office Action dated Feb. 2, 2021 in CN Application No. 201710467490.X.
Office Action dated Dec. 14, 2020 in U.S. Appl. No. 16/224,768, by Arise.
Office Action dated Dec. 21, 2020 in CN Application No. 201710472456.1.
Office Action dated Dec. 22, 2020 in CN Application No. 201710472390.6.
Office Action dated Mar. 10, 2021 in CN Application No. 201710472303.7.

* cited by examiner

NONAQUEOUS ELECTROLYTE SECONDARY BATTERY

This Nonprovisional application claims priority under 35 U.S.C. § 119 on Patent Application No. 2017-243280 filed in Japan on Dec. 19, 2017, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium-ion secondary batteries, have a high energy density, and are therefore in wide use as batteries for a personal computer, a mobile telephone, a portable information terminal, and the like. Such nonaqueous electrolyte secondary batteries have recently been developed as on-vehicle batteries.

For example, Patent Literature 1 discloses a nonaqueous electrolyte secondary battery including a polyolefin porous film whose ratio of (a) a TD-critical load distance (a distance in a transverse direction at which distance a critical load is reached) measured in a scratch test to (b) an MD-critical load distance (a distance in a machine direction at which distance a critical load is reached) measured in a scratch test falls within a certain range.

CITATION LIST

Patent Literature

[Patent Literature 1]
Japanese Patent Application Publication, Tokukai, No. 2017-107848 (Publication Date: Jun. 15, 2017)

SUMMARY OF INVENTION

Technical Problem

Note, however, that there is room for improvement in the above conventional nonaqueous electrolyte secondary battery from the viewpoint of a charge capacity of the nonaqueous electrolyte secondary battery which has been subjected to high-rate discharge. Specifically, the nonaqueous electrolyte secondary battery is required to have a stronger charge capacity characteristic after being subjected to high-rate discharge.

An aspect of the present invention has an object to achieve a nonaqueous electrolyte secondary battery that has an excellent charge capacity characteristic after being subjected to high-rate discharge.

Solution to Problem

A nonaqueous electrolyte secondary battery in accordance with a first aspect of the present invention includes: a separator for a nonaqueous electrolyte secondary battery (hereinafter referred to as a "nonaqueous electrolyte secondary battery separator") including a polyolefin porous film; a porous layer containing a polyvinylidene fluoride-based resin; a positive electrode plate having a capacitance of not less than 1 nF and not more than 1000 nF per measurement area of 900 $mm^2$; and a negative electrode plate having a capacitance of not less than 4 nF and not more than 8500 nF per measurement area of 900 $mm^2$, the polyolefin porous film having a piercing strength of not less than 26.0 $gf/g/m^2$, the piercing strength being measured with respect to a weight per unit area of the polyolefin porous film, the polyolefin porous film having a value in a range of 0.00 to 0.54, the value being represented by the following Expression (1):

$$|1-T/M| \qquad (1)$$

where T represents a distance at which a critical load is reached in a scratch test in which the polyolefin porous film is moved in a transverse direction under a constant load of 0.1 N, and M represents a distance at which a critical load is reached in a scratch test in which the polyolefin porous film is moved in a machine direction under a constant load of 0.1 N, the porous layer being provided between the nonaqueous electrolyte secondary battery separator and at least one of the positive electrode plate and the negative electrode plate, and the polyvinylidene fluoride-based resin containing an α-form polyvinylidene fluoride-based resin in an amount of not less than 35.0 mol % with respect to 100 mol % of a total amount of the α-form polyvinylidene fluoride-based resin and a β-form polyvinylidene fluoride-based resin contained in the polyvinylidene fluoride-based resin, where the amount of the α-form polyvinylidene fluoride-based resin contained is calculated from waveform separation of (α/2) observed at around −78 ppm in a $^{19}$F-NMR spectrum obtained from the porous layer, and waveform separation of {(α/2)+β} observed at around −95 ppm in the $^{19}$F-MMR spectrum obtained from the porous layer.

In a second aspect of the present invention, a nonaqueous electrolyte secondary battery is arranged such that, in the first aspect of the present invention, the positive electrode plate contains a transition metal oxide.

In a third aspect of the present invention, a nonaqueous electrolyte secondary battery is arranged such that, in the first or second aspect of the present invention, the negative electrode plate contains graphite.

In a fourth aspect of the present invention, a nonaqueous electrolyte secondary battery is arranged in any one of the first through third aspects to further include: another porous layer which is provided between (i) the nonaqueous electrolyte secondary battery separator and (ii) at least one of the positive electrode plate and the negative electrode plate.

In a fifth aspect of the present invention, a nonaqueous electrolyte secondary battery is arranged such that, in the fourth aspect of the present invention, the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin, and a water-soluble polymer.

In a sixth aspect of the present invention, a nonaqueous electrolyte secondary battery is arranged such that, in the fifth aspect of the present invention, the polyamide-based resin is an aramid resin.

Advantageous Effects of Invention

An aspect of the present invention makes it possible to achieve a nonaqueous electrolyte secondary battery that has an excellent charge capacity characteristic after being subjected to high-rate discharge.

DESCRIPTION OF EMBODIMENTS

Embodiment 1

Figure 1:
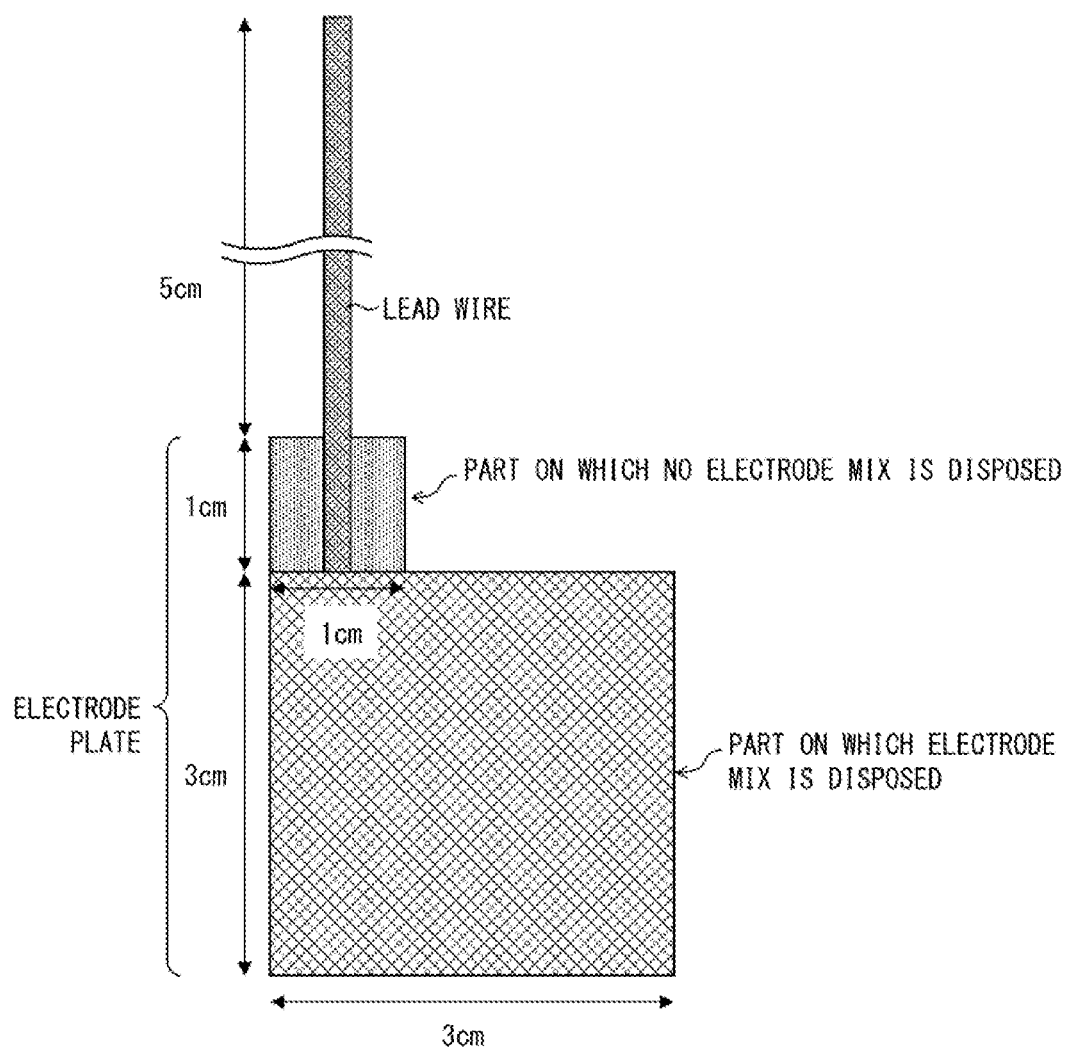
FIG. 1 is a view schematically illustrating a measurement target electrode whose capacitance was to be measured in Examples of the present application.

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

A nonaqueous electrolyte secondary battery in accordance with an embodiment of the present invention includes: a nonaqueous electrolyte secondary battery separator including a polyolefin porous film; a porous layer containing a polyvinylidene fluoride-based resin (hereinafter also referred to as a "PVDF-based resin"); a positive electrode plate having a capacitance of not less than 1 nF and not more than 1000 nF per measurement area of 900 mm$^2$; and a negative electrode plate having a capacitance of not less than 4 nF and not more than 8500 nF per measurement area of 900 mm$^2$, the polyolefin porous film having a piercing strength of not less than 26.0 gf/g/m$^2$, the piercing strength being measured with respect to a weight per unit area of the polyolefin porous film, the polyolefin porous film having a value in a range of 0.00 to 0.54, the value being represented by the following Expression (1):

$$|1-T/M| \qquad (1)$$

where T represents a distance at which a critical load is reached in a scratch test in which the polyolefin porous film is moved in a transverse direction under a constant load of 0.1 N, and M represents a distance at which a critical load is reached in a scratch test in which the polyolefin porous film is moved in a machine direction under a constant load of 0.1 N, the porous layer being provided between the nonaqueous electrolyte secondary battery separator and at least one of the positive electrode plate and the negative electrode plate, and the polyvinylidene fluoride-based resin containing an α-form polyvinylidene fluoride-based resin in an amount of not less than 35.0 mol % with respect to 100 mol % of a total amount of the α-form polyvinylidene fluoride-based resin and a β-form polyvinylidene fluoride-based resin contained in the polyvinylidene fluoride-based resin, where the amount of the α-form polyvinylidene fluoride-based resin contained is calculated from waveform separation of (α/2) observed at around −78 ppm in a $^{19}$F-NMR spectrum obtained from the porous layer, and waveform separation of {(α/2)+β} observed at around −95 ppm in the $^{19}$F-MMR spectrum obtained from the porous layer.

The term "measurement area" herein means an area of a part of a measurement electrode (an upper (main) electrode or a probe electrode) of an LCR meter which part is in contact with a measurement target (a positive electrode plate or a negative electrode plate) in a case where a capacitance is measured by a method for measuring a capacitance (described later). Therefore, a value of a capacitance per measurement area of X mm$^2$ means a value obtained in a case where a capacitance is measured with use of an LCR meter while a measurement target and a measurement electrode are in contact with each other so that a part of the measurement electrode which part is in contact with the measurement target has an area of X mm$^2$.

<Capacitance>

According to an embodiment of the present invention, a value of a capacitance of a positive electrode plate is a value measured by a method for measuring a capacitance of an electrode plate (described later), that is, a value measured while a measurement electrode (probe electrode) is in contact with a surface of the positive electrode plate on which surface a positive electrode active material layer is provided. The capacitance of the positive electrode plate mainly indicates a polarization state of the positive electrode active material layer of the positive electrode plate.

According to an embodiment of the present invention, a value of a capacitance of a negative electrode plate is a value measured by a method for measuring a capacitance of an electrode plate (described later), that is, a value measured while a measurement electrode is in contact with a surface of the negative electrode plate on which surface a negative electrode active material layer is provided. The capacitance of the negative electrode plate mainly indicates a polarization state of the negative electrode active material layer of the negative electrode plate.

In a case where the nonaqueous electrolyte secondary battery is discharged, ions which are charge carriers are released from the negative electrode plate. The ions thus released pass through the nonaqueous electrolyte secondary battery separator and then are taken into the positive electrode plate. In this case, the ions are solvated, by an electrolyte solvent, in the negative electrode plate and on a surface of the negative electrode plate, and are desolvated in the positive electrode plate and on a surface of the positive electrode plate. Note that the ions are each Li$^+$ in a case where, for example, the nonaqueous electrolyte secondary battery is a lithium-ion secondary battery.

Thus, a degree to which the ions are solvated depends on the polarization state of the negative electrode active material layer of the negative electrode plate. A degree to which the ions are desolvated depends on the polarization state of the positive electrode active material layer of the positive electrode plate.

Therefore, the above-described solvation can be adequately promoted by controlling the capacitances of the negative electrode plate and the positive electrode plate so that the capacitances fall within respective suitable ranges, i.e., by controlling the polarization states of the negative electrode active material layer and the positive electrode active material layer so that the polarization states are suitable. This (i) allows enhancement of permeability to the ions which are charge carriers and (ii) allows the nonaqueous electrolyte secondary battery to have an enhanced discharge output characteristic especially in a case where a large electric current is discharged, at a rate of not less than 20 C, from the nonaqueous electrolyte secondary battery. In view of the above description, the negative electrode plate of the nonaqueous electrolyte secondary battery in accordance with an embodiment of the present invention has a capacitance of not less than 4 nF and not more than 8500 nF, preferably not less than 4 nF and not more than 3000 nF, and more preferably not less than 4 nF and not more than 2600 nF, per measurement area of 900 mm$^2$. Note that the capacitance can have a lower limit that is not less than 100 nF, not less than 200 nF, or not less than 1000 nF.

Specifically, in a case where the negative electrode plate has a capacitance of less than 4 nF per measurement area of 900 mm$^2$, polarizability of the negative electrode plate is so low that the negative electrode plate hardly contributes to promotion of the above-described solvation. Therefore, the nonaqueous electrolyte secondary battery which includes such a negative electrode plate does not have an enhanced output characteristic. Meanwhile, in a case where the negative electrode plate has a capacitance of more than 8500 nF per measurement area of 900 mm$^2$, polarizability of the negative electrode plate is so high that inner walls of voids in the negative electrode plate have a too high affinity for the ions. This prevents the ions from moving (being released) from the negative electrode plate. Therefore, the nonaqueous electrolyte secondary battery which includes such a negative electrode plate rather has a deteriorated output characteristic.

In view of the above description, the positive electrode plate of the nonaqueous electrolyte secondary battery in accordance with an embodiment of the present invention has a capacitance of not less than 1 nF and not more than 1000 nF, preferably not less than 2 nF and not more than 600 nF, and more preferably not less than 2 nF and not more than 400 nF, per measurement area of 900 mm$^2$. Note that the capacitance can have a lower limit that is not less than 3 nF.

Specifically, in a case where the positive electrode plate has a capacitance of less than 1 nF per measurement area of 900 mm$^2$, polarizability of the positive electrode plate is so low that the positive electrode plate hardly contributes to the above-described desolvation. Therefore, the nonaqueous electrolyte secondary battery which includes such a positive electrode plate does not have an enhanced output characteristic. Meanwhile, in a case where the positive electrode plate has a capacitance of more than 1000 nF per measurement area of 900 mm$^2$, polarizability of the positive electrode plate is so high that the desolvation excessively progresses. Thus, the electrolyte solvent for the ions to move inside the positive electrode plate is desolvated, and inner walls of voids in the positive electrode plate have a too high affinity for the ions which have been desolvated. This prevents the ions from moving inside the positive electrode plate. Therefore, the nonaqueous electrolyte secondary battery which includes such a positive electrode plate rather has a deteriorated output characteristic.

<Method for Adjusting Capacitance>

It is possible to control the capacitance of the positive electrode plate by adjusting a surface area of the positive electrode active material layer, and it is possible to control the capacitance of the negative electrode plate by adjusting a surface area of the negative electrode active material layer. Specifically, by, for example, rubbing a surface of each of the positive electrode active material layer and the negative electrode active material layer with use of an abrasive paper or the like, it is possible to increase the surface area of each of the positive electrode active material layer and the negative electrode active material layer, and consequently to increase the capacitance of each of the positive electrode plate and the negative electrode plate. Alternatively, it is possible to adjust the capacitance of the positive electrode plate by adjusting a relative dielectric constant of a material of which the positive electrode plate is made, and it is possible to control the capacitance of the negative electrode plate by adjusting a relative dielectric constant of a material of which the negative electrode plate is made. The relative dielectric constant can be adjusted by changing the shape of the voids in each of the positive electrode plate and the negative electrode plate, a porosity of each of the positive electrode plate and the negative electrode plate, and distribution of the voids in each of the positive electrode plate and the negative electrode plate. The relative dielectric constant can be alternatively controlled by adjusting the material of which each of the positive electrode plate and the negative electrode plate is made.

<Method for Measuring Capacitance of Electrode Plate>

According to an embodiment of the present invention, the capacitance of the electrode plate (positive electrode plate or negative electrode plate) per measurement area of 900 mm$^2$ is measured with use of an LCR meter, at a frequency of 300 KHz, and under conditions set as follows: CV: 0.010 V, SPEED: SLOW2, AVG: 8, CABLE: 1 m, OPEN: All, SHORT: All DCBIAS 0.00 V.

Note that, according to the above measurement of the capacitance, the capacitance of the electrode plate which has not been included in the nonaqueous electrolyte secondary battery is measured. Note that a value of a capacitance is a unique value that is determined depending on, for example, the shape (surface area) of a solid insulating material (electrode plate), a material of which the solid insulating material is made, the shape of voids in the solid insulating material, a porosity of the solid insulating material, and distribution of the voids in the solid insulating material. Therefore, the electrode plate which has been included in the nonaqueous electrolyte secondary battery is equivalent in value of the capacitance to the electrode plate which has not been included in the nonaqueous electrolyte secondary battery.

Note that the capacitance of each of the positive electrode plate and the negative electrode plate can be measured after (i) the positive electrode plate and the negative electrode plate are included in the nonaqueous electrolyte secondary battery, (ii) the nonaqueous electrolyte secondary battery is charged and discharged, and then (iii) the positive electrode plate and the negative electrode plate are taken out from the nonaqueous electrolyte secondary battery. Specifically, for example, an electrode laminated body (a member for a nonaqueous electrolyte secondary battery (hereinafter referred to as a "nonaqueous electrolyte secondary battery member")) is taken out from an exterior member of the nonaqueous electrolyte secondary battery, and is dismantled so that one electrode plate (positive electrode plate or negative electrode plate) is taken out. From the one electrode plate thus taken out, a test piece is cut off which has a size similar to that of the electrode plate which is to be subjected to the measurement in the above-described method for measuring a capacitance of an electrode plate. Subsequently, the test piece thus obtained is cleaned several times (e.g., three times) in diethyl carbonate (DEC). The cleaning is a step of removing, for example, an electrolyte, a product of decomposition of the electrolyte, and a lithium salt, each adhering to a surface of the test piece (electrode plate), by (i) placing the test piece in the DEC so as to clean the test piece and then (ii) repeating, several times (e.g., three times), a step of replacing the DEC with new DEC and cleaning the test piece in the new DEC. A resultant electrode plate which has been cleaned is sufficiently dried and then is used as a measurement target electrode. The exterior member of the nonaqueous electrolyte secondary battery, from which exterior member the electrode laminated body is to be taken out, can be of any kind, and the electrode laminated body can have a laminated structure of any kind.

<Nonaqueous Electrolyte Secondary Battery Separator>

A nonaqueous electrolyte secondary battery separator of an embodiment of the present invention includes a polyolefin porous film. Note that in the following description, the polyolefin porous film may also be referred to as a "porous film".

The porous film alone can be a nonaqueous electrolyte secondary battery separator. The porous film can also be a base material of a laminated separator for a nonaqueous electrolyte secondary battery (hereinafter referred to as a "nonaqueous electrolyte secondary battery laminated separator") (described later) in which a porous layer is disposed on the porous film. The porous film contains a polyolefin-based resin as a main component and has therein many pores connected to one another. This allows a gas and a liquid to pass through the porous film from one surface to the other.

The nonaqueous electrolyte secondary battery separator of an embodiment of the present invention can be arranged such that a porous layer containing a polyvinylidene fluoride-based resin (described later) is disposed on at least one of surfaces of the nonaqueous electrolyte secondary battery separator. In this case, a laminated body including (i) the nonaqueous electrolyte secondary battery separator and (ii) the porous layer which is disposed on at least one of the surfaces of the nonaqueous electrolyte secondary battery separator is herein referred to as a "nonaqueous electrolyte secondary battery laminated separator". The "nonaqueous electrolyte secondary battery laminated separator" may be hereinafter referred to as a "laminated separator". The nonaqueous electrolyte secondary battery separator of an embodiment of the present invention can further include other layer(s), different from the polyolefin porous film, such as an adhesive layer, a heat-resistant layer, and/or a protective layer.

(Polyolefin Porous Film)

The porous film contains polyolefin in an amount of not less than 50% by volume, preferably not less than 90% by volume, and more preferably not less than 95% by volume, with respect to the entire porous film. The polyolefin more preferably contains a high molecular weight component having a weight-average molecular weight of $5 \times 10^5$ to $15 \times 10^6$. In particular, the polyolefin which contains a high molecular weight component having a weight-average molecular weight of not less than 1,000,000 is more preferable because such polyolefin allows a nonaqueous electrolyte secondary battery separator to have a higher strength.

Specific examples of the polyolefin, which is a thermoplastic resin, include a homopolymer and a copolymer each obtained by (co)polymerizing a monomer(s) such as ethylene, propylene, 1-butene, 4-methyl-1-pentene, and/or 1-hexene. Examples of the homopolymer include polyethylene, polypropylene, and polybutene. Examples of the copolymer include an ethylene-propylene copolymer.

Among the above examples, polyethylene is more preferable. This is because polyethylene is capable of preventing (shutting down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Of these polyethylenes, ultra-high molecular weight polyethylene having a weight-average molecular weight of not less than 1,000,000 is more preferable.

The porous film has a film thickness of preferably 4 μm to 40 μm, more preferably 5 μm to 30 μm, and still more preferably 6 μm to 15 μm.

The porous film can have a weight per unit area which weight is determined as appropriate in view of the strength, the film thickness, the weight, and handleability of a nonaqueous electrolyte secondary battery laminated separator including the porous film. Note, however, that the porous film has a weight per unit area of preferably 4 $g/m^2$ to 20 $g/m^2$, more preferably 4 $g/m^2$ to 12 $g/m^2$, and still more preferably 5 $g/m^2$ to 10 $g/m^2$, so as to allow the nonaqueous electrolyte secondary battery which includes the nonaqueous electrolyte secondary battery laminated separator including the porous film to have a higher weight energy density and a higher volume energy density.

The porous film has a piercing strength of preferably not less than 26.0 $gf/g/m^2$, and more preferably not less than 30.0 $gf/g/m^2$, the piercing strength being measured with respect to a weight per unit area of the porous film. The porous film which has an excessively small piercing strength, i.e., the porous film which has a piercing strength of less than 26.0 $gf/g/m^2$ is not preferable for the following reason. Specifically, when a nonaqueous electrolyte secondary battery separator including such a porous film is used, the separator may be pierced by positive electrode active material particles and negative electrode active material particles in a case where, for example, (i) an laminating and winding operation to laminate and wind a positive electrode, a negative electrode, and the separator is carried out during a battery assembling process, (ii) an operation to press a wound group which has been subjected to the laminating and winding operation, or (iii) a pressure is externally applied to the battery. This may cause a short circuit between the positive electrode and the negative electrode.

The porous film has an air permeability of preferably 30 sec/100 mL to 500 sec/100 mL, and more preferably 50 sec/100 mL to 300 sec/100 mL, in terms of Gurley values. The porous film which has an air permeability falling within the above range makes it possible to achieve sufficient ion permeability.

The porous film has a porosity of preferably 20% by volume to 80% by volume, and more preferably 30% by volume to 75% by volume, so as to (i) retain a larger amount of electrolyte and (ii) obtain a function of reliably preventing (shutting down) a flow of an excessively large electric current at a lower temperature. Further, in order to achieve sufficient ion permeability and prevent particles from entering a positive electrode and/or a negative electrode of the nonaqueous electrolyte secondary battery, the porous film has pores each having a pore size of preferably not more than 0.3 μm, and more preferably not more than 0.14 μm.

The porous film can be produced by, for example, (1) a method of obtaining a porous film by adding a filler (pore forming agent) to a resin such as polyolefin, shaping the resin into a sheet, then removing the filler with use of an appropriate solvent, and stretching the sheet from which the filler has been removed, or (2) a method of obtaining a porous film by adding a filler to a resin such as polyolefin, shaping the resin into a sheet, then stretching the sheet, and removing the filler from the sheet which has been stretched. That is, a resultant porous film normally contains no filler.

The porous film has a value in a range of 0.00 to 0.54, preferably 0.00 to 0.50, and more preferably 0.00 to 0.45, the value being represented by the following Expression (1):

$$|1 - T/M| \quad (1)$$

where T represents a distance at which a critical load is reached in a scratch test in which the polyolefin porous film is moved in a transverse direction under a constant load of 0.1 N, and M represents a distance at which a critical load is reached in a scratch test in which the polyolefin porous film is moved in a machine direction under a constant load of 0.1 N, The porous film also has a value in a range of preferably 0.00 to 0.54, more preferably 0.00 to 0.50, and still more preferably 0.00 to 0.45, the value being represented by the following Expression (2):

$$1 - T/M \quad (2)$$

where T represents a distance at which a critical load is reached in a scratch test in which the porous film is moved in a TD under a constant load of 0.1 N, and M represents a distance at which a critical load is reached in a scratch test in which the porous film is moved in an MD under a constant load of 0.1 N.

The values represented by the respective Expressions (1) and (2) are each a value indicative of anisotropy of a distance at which a critical load is reached (hereinafter referred to as a "critical load distance") in a scratch test. The value which is closer to zero indicates that the critical load distance is more isotropic.

Figure 3:
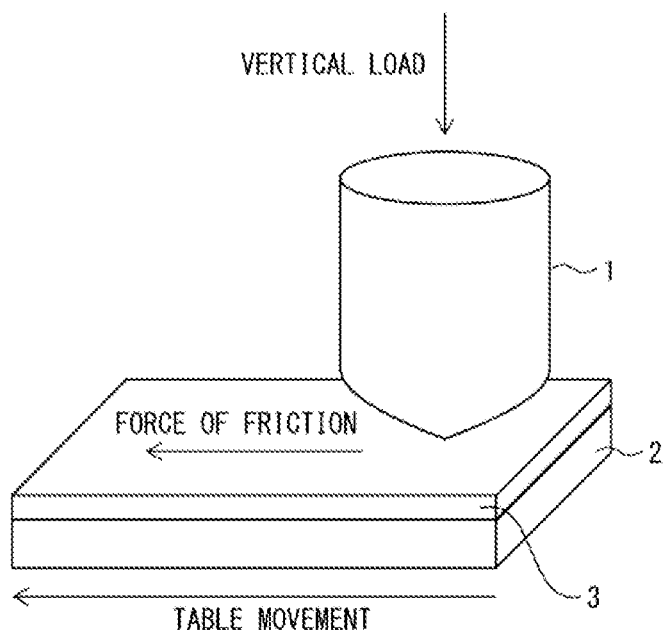
FIG. 3 is a view schematically illustrating (i) a device used in a scratch test in accordance with an embodiment of the present invention and (ii) an operation of the device.

FIG. 3 is a view schematically illustrating (i) a device used in a scratch test in accordance with an embodiment of the present invention and (ii) an operation of the device. In FIG. 3, reference number 1 indicates a diamond indenter, reference number 2 indicates a substrate, and reference number 3 indicates a porous film.

As illustrated in FIG. 3, a "scratch test" in accordance with an embodiment of the present invention is a test for measuring a stress that occurs in a distance by which the porous film 3 is moved in a horizontal direction while a surface layer of the porous film 3, which is a measurement target, is subjected to compressive deformation in a thicknesswise direction of the porous film 3 by applying a certain load to the diamond indenter 1 (i.e. while the diamond indenter 1 is pressed down). Specifically, the scratch test is carried out by a method including the following steps.

(1) The porous film 3, which is a measurement target, is cut into a piece of 20 mm×60 mm. Then, the piece of the porous film 3 and a substrate (glass preparation) 2 of 30 mm×70 mm are combined with use of aqueous glue. Then, the piece and the substrate thus combined are dried at a temperature of 25° C. for one whole day and night, so that a test sample is prepared. Note that the piece of the porous film 3 and the substrate (glass preparation) 2 are to be carefully combined so that no air bubbles are made therebetween.

(2) The test sample prepared in the step (1) is placed on a microscratch testing device (manufactured by CSEM Instruments). Then, while the diamond indenter 1 of the testing device is applying a vertical load of 0.1 N to the test sample, a table of the testing device is moved by a distance of 10 mm in a TD of the porous film 3 at a speed of 5 mm/min. During the movement of the table, a stress (force of friction) that occurs between the diamond indenter 1 and the test sample is measured.

Figure 4:
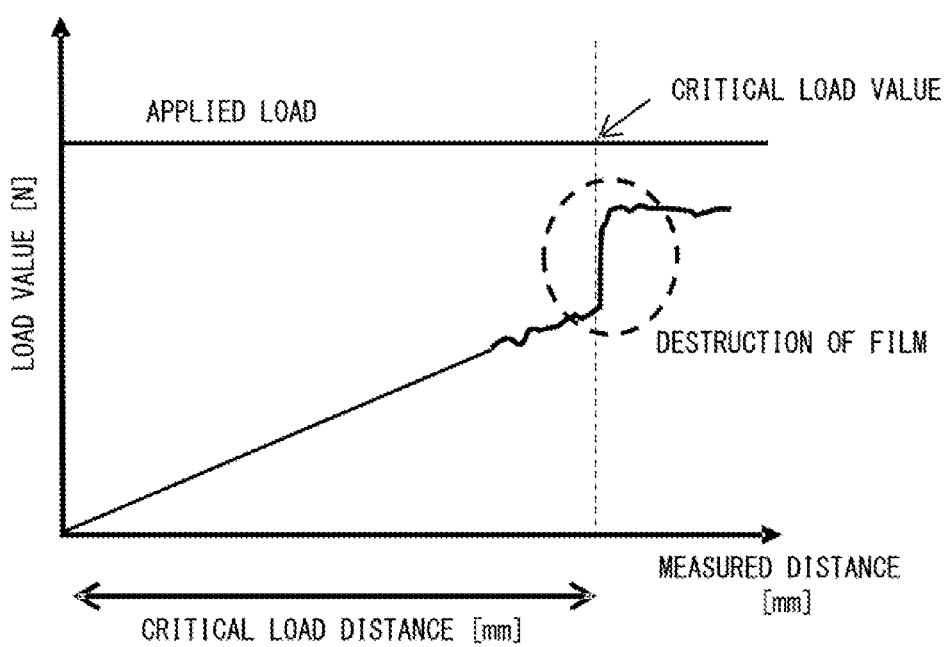
FIG. 4 is a graph which has been made based on results of a scratch test in accordance with an embodiment of the present invention and which shows, as an example, a relationship between (a) a critical load and (b) a distance at which the critical load is reached.

(3) A line graph is made which shows a relationship between displacement of the stress measured in the step (2) and the distance of the movement of the table. Then, based on the line graph, (i) a critical load value in the TD and (ii) a distance in the TD at which distance a critical load is reached are calculated as illustrated in FIG. 4. FIG. 4 is a graph which has been made based on results of a scratch test in accordance with an embodiment of the present invention and which shows, as an example, a relationship between (a) a critical load and (b) a distance at which the critical load is reached.

(4) The direction in which the table is moved is changed to an MD, and the above steps (1) through (3) are repeatedly carried out so that (i) a critical load value in the MD and (ii) a distance in the MD at which distance a critical load is reached are calculated. Note that the "TD" means a "transverse direction" and the "MD" means a "machine direction".

Note that any conditions and the like that are different from the conditions described above and under which to carry out the measurement in the scratch test are similar to those disclosed in JIS R 3255.

The scratch test is a test in which measurement and calculation is carried out by modeling a mechanism for influence of expansion of an electrode active material layer during charge and discharge (expansion of a negative electrode during charge, and expansion of a positive electrode during discharge) of a nonaqueous electrolyte secondary battery, which includes a nonaqueous electrolyte secondary battery separator including a porous film serving as a measurement target, on (i) a first surface layer of the porous film, which first surface layer faces the expanded electrode, and (ii) a second surface layer of the porous film, which second surface layer is opposite the first surface layer.

Note here that the expansion and shrinkage of the electrode active material layer during charge and discharge of the nonaqueous electrolyte secondary battery causes the first surface layer of the porous film, which first surface layer faces the expanded electrode, to be deformed (subjected to compressive deformation) in a thicknesswise direction of the porous film by the expanded electrode active material layer. In addition, the expansion of the electrode active material layer in a horizontal direction causes a shearing stress to occur in a surface-wise direction of the porous film. Furthermore, the shearing stress is transmitted, via the porous film, to an interface between (a) the second surface layer of the porous film, which second surface layer is opposite the first surface layer, which faces the expanded electrode, and (b) the electrode.

Therefore, a critical load distance calculated by the scratch test serves as (a) an indicator of whether a surface layer of the porous film which surface layer faces the electrode is easily plastically-deformed and (b) an indicator of how easily a shearing stress is transmitted to a surface of the porous film which surface is opposite a measured surface (surface facing the electrode) of the porous film. A long critical load distance indicates that (a') a surface layer part of a porous film to be measured is not easily plastically-deformed and (b') a shearing stress is less easily transmitted to a surface, opposite a measured surface, of the porous film to be measured.

In view of the above description, the porous film which has a value beyond 0.54, the value being represented by the Expression (1) shows that the porous film has a large anisotropy between the critical load distance in the TD and the critical load distance in the MD. In a nonaqueous electrolyte secondary battery which includes either of a nonaqueous electrolyte secondary battery separator and a nonaqueous electrolyte secondary battery laminated separator each including the porous film which has such a large anisotropy, a wrinkle and a gap occur at an interface between (a) the nonaqueous electrolyte secondary battery separator or the nonaqueous electrolyte secondary battery laminated separator and (b) the electrode predominantly in a certain direction. The occurrence of the wrinkle and the gap is due to (i) a difference between the TD and the MD in size of plastic deformation, caused by battery charge and discharge, of the surface layer of the porous film and (ii) a difference between the TD and the MD in easiness of transmission of a surface stress to a surface of the porous film which surface is opposite a surface of the porous film which surface faces the expanded electrode.

Since the nonaqueous electrolyte secondary battery in accordance with an embodiment of the present invention has a value in a range of 0.00 to 0.54, the value being represented by the Expression (1), the critical load distance is isotropic. This makes it possible to restrain a pore structure of the porous film from being deformed due to charge and discharge of the battery. As a result, it is possible to restrain a deterioration in performance of the battery.

Note that a physical property value of the porous film on which a porous layer and/or another layer are/is disposed can be measured after the porous layer and/or the another layer are/is removed from a laminated body including the porous film and the porous layer and/or the another layer. The porous layer and/or the another layer can be removed from the laminated body by, for example, a method of dissolving a resin of the porous layer and/or the another layer with use of a solvent such as N-methylpyrrolidone or acetone so as to remove the resin.

The following description will discuss a nonaqueous electrolyte secondary battery which is an aspect of a laminated secondary battery including electrode plates and a nonaqueous electrolyte secondary battery separator and which is arranged such that a laminated body including the electrode plates and the nonaqueous electrolyte secondary battery separator is wound. Note that a laminated secondary battery herein refers to a nonaqueous electrolyte secondary battery having a structure in which electrodes and a nonaqueous electrolyte secondary battery separator are disposed.

In the nonaqueous electrolyte secondary battery which is arranged such that the laminated body is wound, the nonaqueous electrolyte secondary battery separator is wound while a tensile force is being applied thereto in a machine direction. This causes an increase in smoothness in the machine direction of a porous film, and causes an internal stress to be inwardly applied in a transverse direction of the porous film. Therefore, according to the nonaqueous electrolyte secondary battery which is arranged such that the laminated body is wound, (i) a critical load distance in the machine direction during actual operation of the nonaqueous electrolyte secondary battery is longer than a critical load distance in a machine direction which critical load distance is calculated in the scratch test, and (ii) a critical load distance in the transverse direction during actual operation of the nonaqueous electrolyte secondary battery is shorter than a critical load distance in a transverse direction which critical load distance is calculated in the scratch test.

Therefore, in a case where a critical load distance in the transverse direction and a critical load distance in the machine direction are similar (i.e. highly isotropic), specifically, in a case where a porous film having a value of not less than −0.54 and less than 0.00, the value being represented by the Expression (2), is used as a separator or as a member of a separator in a nonaqueous electrolyte secondary battery which is arranged such that a laminated body is wound, the critical load distance in the machine direction increases, and the critical load distance in the transverse direction decreases.

Therefore, in actual operation of the nonaqueous electrolyte secondary battery, a wrinkle and a gap occur at an interface between (a) the porous film and (b) the electrode predominantly in the transverse direction. The occurrence of the wrinkle and the gap is due to (i) a difference between the transverse direction and the machine direction in size of plastic deformation of a surface layer of the porous film and (ii) a difference between the transverse direction and the machine direction in easiness of transmission of a surface stress to a surface of the porous film which surface is opposite a surface of the porous film which surface faces the expanded electrode. This causes a decrease in surface-wise uniformity in distance between the electrodes.

Meanwhile, in a case where the nonaqueous electrolyte secondary battery which is arranged such that the laminated body is wound has highly anisotropic critical load distances in the transverse direction and in the machine direction, specifically, in a case where the value represented by the Expression (1) is beyond 0.54, for a reason similar to the reason described earlier, more wrinkles and more gaps occur at an interface between (a) the porous film and (b) the electrode in a direction in which a critical load distance is longer. The occurrence of the wrinkles and the gaps is due to (i) a difference between the transverse direction and the machine direction in size of plastic deformation of a surface layer of the porous film and (ii) a difference between the transverse direction and the machine direction in easiness of transmission of a surface stress to a surface of the porous film which surface is opposite a surface of the porous film which surface faces the expanded electrode. This causes a reduction in a discharge rate characteristic maintenance rate of the nonaqueous electrolyte secondary battery which has been subjected to a discharge cycle. Therefore, the value represented by the Expression (2) is preferably in a range of 0.00 to 0.54. This is because the porous film which has such a value can be suitably used for the nonaqueous electrolyte secondary battery which is arranged such that the laminated body is wound.

Note that a critical load distance in a transverse direction and a critical load distance in a machine direction are considered to be greatly affected by the following structure factors of a porous film.

(i) How resin polymers are oriented in the machine direction of the porous film
(ii) How resin polymers are oriented in the transverse direction of the porous film
(iii) How the resin polymers which are oriented in the machine direction and the resin polymers which are oriented in the transverse direction are in contact with each other in a thicknesswise direction of the porous film Therefore, the value represented by the Expression (1) and the value represented by the Expression (2) can be controlled by, for example, controlling the above structure factors (i) through (iii) by adjusting the following production conditions under which a porous film production method (described later) is carried out.

(1) Circumferential velocity [m/min] of rolling mill roll
(2) Ratio of stretch temperature to stretch ratio [° C./%]

Specifically, the circumferential velocity of the rolling mill roll and the ratio of the stretch temperature during stretching to the stretch ratio are adjusted so that the circumferential velocity of the rolling mill roll, the stretch temperature during stretching, and the stretch ratio satisfy a relationship represented by Expression (3) below, provided that production of the porous film is not hindered. This allows each of the value represented by the Expression (1) and the value represented by the Expression (2) to be controlled in a range of 0.00 to 0.54.

$$Y \geq -2.3 \times X + 22.2 \quad (3)$$

where (i) X represents the circumferential velocity of the rolling mill roll and (ii) Y represents the ratio of the stretch temperature during stretching to the stretch ratio in the transverse direction.

Meanwhile, in a case where the circumferential velocity of the rolling mill roll and the ratio of the stretch temperature during stretching to the stretch ratio are set so as to fall outside the range satisfying the relationship represented by the Expression (3), (i) the orientation of the resin polymers in the machine direction of the porous film or the orientation of the resin polymers in the transverse direction of the porous film is promoted and/or (ii) connectivity, in the thicknesswise direction of the porous film, of the resin polymers which are oriented in the machine direction or of the resin polymers which are oriented in the transverse direction is promoted. This causes the anisotropy of the porous film which anisotropy is represented by the Expression (1) to be large, so that the value represented by the Expression (1) cannot be controlled in a range of 0.00 to 0.54. For example, in a case where the circumferential velocity of the rolling mill roll is adjusted to 2.5 m/min and the ratio of the stretch temperature to the stretch ratio is adjusted to less than 16.5° C./%, (i) the orientation of the resin polymers in the transverse direction of the porous film is promoted and (ii) connectivity, in the thicknesswise direction of the porous film, of the resin polymers which are oriented in the transverse direction is promoted. This causes a critical load distance in the transverse direction to be short, so that the anisotropy represented by the Expression (1) is more than 0.54.

The stretch temperature is preferably 90° C. to 120° C., and more preferably 100° C. to 110° C. The stretch ratio is preferably 600% to 800%, and more preferably 620% to 700%.

The structure factor (i) can be controlled mainly by the production condition (1). The structure factor (ii) can be controlled mainly by the production condition (2). The structure factor (iii) can be controlled mainly by a combination of the production conditions (1) and (2).

In a case where the nonaqueous electrolyte secondary battery laminated separator in accordance with an embodiment of the present invention is produced, i.e., in a case where the porous layer containing a polyvinylidene fluoride-based resin (described later) is disposed on the porous film, the porous film is more preferably subjected to a hydrophilization treatment before the porous layer is formed, that is, before the porous film is coated with a coating solution (described later).

The porous film which has been subjected to the hydrophilization treatment is more coatable with a coating solution. This allows a more uniform porous layer to be formed. The hydrophilization treatment is effective in a case where water accounts for a high proportion of a solvent (dispersion medium) contained in the coating solution. Specific examples of the hydrophilization treatment include publicly known treatments such as (i) a chemical treatment carried out with use of an acid, an alkali, or the like, (ii) a corona treatment, and (iii) a plasma treatment. Of these hydrophilization treatments, the corona treatment is more preferable. This is because the corona treatment allows a porous film to be hydrophilized in a relatively short period of time and causes only a surface and its vicinity of the porous film to be hydrophilized, so that the inside of the porous film remains unchanged in quality.

(Porous Layer)

A porous layer is provided between the nonaqueous electrolyte secondary battery separator and at least one of the positive electrode plate and the negative electrode plate so as to serve as a member of a nonaqueous electrolyte secondary battery. The porous layer can be disposed on one surface or both surfaces of the nonaqueous electrolyte secondary battery separator. Alternatively, the porous layer can be disposed on an active material layer of at least one of the positive electrode plate and the negative electrode plate. Alternatively, the porous layer can be provided between the nonaqueous electrolyte secondary battery separator and at least one of the positive electrode plate and the negative electrode plate so as to be in contact with the nonaqueous electrolyte secondary battery separator and with the at least one of the positive electrode plate and the negative electrode plate. The number of porous layer(s) which is/are provided between the nonaqueous electrolyte secondary battery separator and at least one of the positive electrode plate and the negative electrode plate can be one, or two or more.

A porous layer is preferably an insulating porous layer containing a resin.

It is preferable that a resin which can be contained in the porous layer be insoluble in an electrolyte of a battery and be electrochemically stable when the battery is in normal use. In a case where the porous layer is disposed on one surface of the porous film, the porous layer is disposed preferably on a surface of the porous film which surface faces the positive electrode plate of the nonaqueous electrolyte secondary battery, and more preferably on a surface of the porous film which surface is in contact with the positive electrode plate.

A porous layer of an embodiment of the present invention contains a PVDF-based resin, the PVDF-based resin containing a PVDF-based resin having crystal form α (hereinafter, referred to as an α-form PVDF-based resin) in an amount of not less than 35.0 mol % with respect to 100 mol % of a total amount of the α-form PVDF-based resin and a PVDF-based resin having crystal form β (hereinafter, referred to as a β-form PVDF-based resin), the α-form PVDF-based resin and the β-form PVDF-based resin each being contained in the PVDF-based resin.

Note here that the amount of the α-form PVDF-based resin contained is calculated from waveform separation of (α/2) observed at around −78 ppm in a $^{19}$F-NMR spectrum obtained from the porous layer, and waveform separation of {(α/2)+β} observed at around −95 ppm in the $^{19}$F-MMR spectrum obtained from the porous layer.

The porous layer has a structure in which many pores, connected to one another, are provided, so that the porous layer is a layer through which a gas or a liquid can pass from one surface to the other. Further, in a case where the porous layer of an embodiment of the present invention is used as a member of a nonaqueous electrolyte secondary battery laminated separator, the porous layer can be a layer which, while serving as an outermost layer of the nonaqueous electrolyte secondary battery laminated separator, adheres to an electrode.

Examples of the PVDF-based resin include homopolymers of vinylidene fluoride; copolymers of vinylidene fluoride and other monomer(s) copolymerizable with vinylidene fluoride; and mixtures of the above polymers. Examples of a monomer polymerizable with vinylidene fluoride include hexafluoropropylene, tetrafluoroethylene, trifluoroethylene, trichloroethylene, and vinyl fluoride. These monomers can be used in one kind or in combination of two or more kinds. The PVDF-based resin can be synthesized through emulsion polymerization or suspension polymerization.

The PVDF-based resin contains vinylidene fluoride in an amount of normally not less than 85 mol %, preferably not less than 90 mol %, more preferably not less than 95 mol %, and still more preferably not less than 98 mol %. The PVDF-based resin which contains vinylidene fluoride in an amount of not less than 85 mol % is more likely to allow the porous layer to have a mechanical strength against pressure and a heat resistance against heat during battery production.

In another aspect, the porous layer preferably contains two kinds of PVDF-based resins (that is, a first resin and a second resin below) that differ from each other in, for example, amount of hexafluoropropylene contained.

The first resin is a vinylidene fluoride-hexafluoropropylene copolymer containing hexafluoropropylene in an amount of more than 0 mol % and not more than 1.5 mol % or (ii) a vinylidene fluoride homopolymer.

The second resin is a vinylidene fluoride-hexafluoropropylene copolymer containing hexafluoropropylene in an amount of more than 1.5 mol %.

The porous layer which contains the two kinds of PVDF-based resins adheres better to an electrode as compared with the porous layer which does not contain one of the two kinds of PVDF-based resins. Further, as compared with the porous layer which does not contain one of the two kinds of PVDF-based resins, the porous layer which contains the two kinds of PVDF-based resins adheres better to another layer (e.g., a porous film layer) of the nonaqueous electrolyte secondary battery separator, and consequently a higher peel force is required to peel the porous layer and the another layer from each other. The first resin and the second resin preferably have therebetween a mass ratio of 15:85 to 85:15.

The PVDF-based resin preferably has a weight-average molecular weight of 200,000 to 3,000,000, more preferably 200,000 to 2,000,000, and still more preferably 500,000 to 1,500,000. The PVDF-based resin which has a weight-average molecular weight of not less than 200,000 tends to allow the porous layer and the electrode to adhere well to each other. Meanwhile, the PVDF-based resin which has a weight-average molecular weight of not more than 3,000,000 tends to be easily formable.

The porous layer of an embodiment of the present invention can contain a resin which is different from the PVDF-based resin and is exemplified by styrene-butadiene copolymers; homopolymers or copolymers of vinyl nitriles such as acrylonitrile and methacrylonitrile; and polyethers such as polyethylene oxide and polypropylene oxide.

The porous layer of an embodiment of the present invention can contain a filler. The filler can be an inorganic filler (e.g., metal oxide fine particles), an organic filler, or the like. The porous layer contains the filler in an amount of preferably not less than 1% by mass and not more than 99% by mass, and more preferably not less than 10% by mass and not more than 98% by mass, with respect to a total amount of the PVDF-based resin and the filler. The amount of the filler contained in the porous layer has a lower limit that can be not less than 50% by mass, not less than 70% by mass, or not less than 90% by mass. The organic filler can be a conventionally publicly known organic filler, and the inorganic filler can be a conventionally publicly known inorganic filler.

In order to achieve (i) adhesiveness of the porous layer to an electrode and (ii) a high energy density, the porous layer of an embodiment of the present invention has an average thickness of preferably 0.5 µm to 10 µm (per layer), and more preferably 1 µm to 5 µm (per layer).

The porous layer preferably has a thickness of not less than 0.5 µm (per layer). This is because the porous layer which has such a thickness (i) makes it possible to sufficiently restrain an internal short circuit that might occur due to, for example, breakage of the nonaqueous electrolyte secondary battery and (ii) allows the porous layer to retain an electrolyte in an adequate amount.

Meanwhile, the porous layer which has a thickness of more than 10 µm (per layer) causes an increase in resistance to lithium ion permeation in the nonaqueous electrolyte secondary battery. Thus, the nonaqueous electrolyte secondary battery which is repeatedly subjected to charge and discharge cycles deteriorates in positive electrode and also deteriorates in rate characteristic and cycle characteristic. Further, such a porous layer makes a distance between the positive electrode and the negative electrode greater. This causes the nonaqueous electrolyte secondary battery to have a lower internal volume efficiency.

The porous layer of an embodiment of the present invention is preferably provided between the nonaqueous electrolyte secondary battery separator and the positive electrode active material layer of the positive electrode plate. Physical properties of the porous layer which are described below at least refer to physical properties of the porous layer which serves as a member of the nonaqueous electrolyte secondary battery and which is provided between the nonaqueous electrolyte secondary battery separator and the positive electrode active material of the positive electrode plate.

The porous layer can have a weight per unit area (per layer) which weight is appropriately determined in view of the strength, the film thickness, the weight, and handleability of the porous layer. A coating amount (weight per unit area) of the porous layer is preferably 0.5 g/m$^2$ to 20 g/m$^2$ per layer and more preferably 0.5 g/m$^2$ to 10 g/m$^2$ per layer.

The porous layer which has a weight per unit area which weight falls within the above numerical range allows the nonaqueous electrolyte secondary battery which includes the porous layer to have a higher weight energy density and a higher volume energy density. The porous layer which has a weight per unit area which weight is more than the upper limit of the above range makes the nonaqueous electrolyte secondary battery heavy.

In order to achieve sufficient ion permeability, the porous layer has a porosity of preferably 20% by volume to 90% by volume, and more preferably 30% by volume to 80% by volume. The porous layer has pores whose pore size is preferably not more than 1.0 µm, and more preferably not more than 0.5 µm. The pores which have a pore size falling within the above range allows the nonaqueous electrolyte secondary battery which includes the nonaqueous electrolyte secondary battery laminated separator including the porous layer to achieve sufficient ion permeability.

The nonaqueous electrolyte secondary battery laminated separator has an air permeability of preferably 30 sec/100 mL to 1000 sec/100 mL, and more preferably 50 sec/100 mL to 800 sec/100 mL, in terms of Gurley values. The nonaqueous electrolyte secondary battery laminated separator which has an air permeability falling within the above range allows the nonaqueous electrolyte secondary battery to achieve sufficient ion permeability.

The air permeability which is less than the lower limit of the above range means that the nonaqueous electrolyte secondary battery laminated separator has a high porosity and thus has a coarse laminated structure. This may cause the nonaqueous electrolyte secondary battery laminated separator to have a lower strength and consequently to be insufficient particularly in shape stability at a high temperature. Meanwhile, the air permeability which is more than the upper limit of the above range may prevent the nonaqueous electrolyte secondary battery laminated separator from achieving sufficient ion permeability and consequently degrade battery characteristics of the nonaqueous electrolyte secondary battery.

(Crystal Forms of PVDF-Based Resin)

The PVDF-based resin contained in the porous layer which is used for an embodiment of the present invention contains an α-form PVDF-based resin in an amount of not less than 35.0 mol %, preferably not less than 37.0 mol %, more preferably not less than 40.0 mol %, and still more preferably not less than 44.0 mol %, with respect to 100 mol % of a total amount of the α-form PVDF-based resin and a β-form PVDF-based resin contained in the PVDF-based resin. Further, the amount of the α-form PVDF-based resin is preferably not more than 90.0 mol %. The porous layer which contains the α-form PVDF-based resin in an amount falling within the above range is suitably used as a member of a nonaqueous electrolyte secondary battery that excels in retention of a charge capacity after being discharged at a high rate, in particular, a member of a nonaqueous electrolyte secondary battery laminated separator or of a nonaqueous electrolyte secondary battery electrode.

The nonaqueous electrolyte secondary battery which is being charged and discharged generates heat due to internal resistance thereof. A larger electric current, that is, a higher rate condition leads to generation of a larger amount of heat. The α-form PVDF-based resin contained in the PVDF-based resin has a higher melting point than the β-form PVDF-based resin contained in the PVDF-based resin, and is less likely to be plastically deformed by heat. Furthermore, the β-form PVDF-based resin, which has a structure in which F atoms are aligned in one direction, is known to be more polarized than the α-form PVDF-based resin.

According to the porous layer of an embodiment of the present invention, in a case where the PVDF-based resin of the porous layer contains the α-form PVDF-based resin in an amount that is not less than a certain amount, it is possible to not only reduce (i) deformation of an internal structure of the porous layer, (ii) clogging of voids in the porous layer, and/or (iii) the like due to deformation of the PVDF-based resin which deformation is caused by generation of heat during charge and discharge of the nonaqueous electrolyte secondary battery, in particular, during operation of the nonaqueous electrolyte secondary battery under a high rate condition, but also avoid uneven distribution of Li ions due to interaction between the Li ions and the PVDF-based resin. As a result, it is possible to restrain a deterioration in performance of the battery.

The α-form PVDF-based resin is arranged such that the PVDF-based resin is made of a polymer containing a PVDF skeleton. The PVDF skeleton has a conformation in which there are two or more consecutive chains of a steric structure in which molecular chains include a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 60°), the conformation being the following conformation:

($TG\overline{T}\overline{G}$-type conformation) [Math. 1]

and a molecular chain having the following type:

$$TG\overline{T}\overline{G}$$ [Math. 2]

wherein respective dipole moments of C—$F_2$ and C—$H_2$ bonds each have a component perpendicular to the molecular chain and a component parallel to the molecular chain.

The α-form PVDF-based resin has characteristic peaks at around −95 ppm and around −78 ppm in a $^{19}$F-NMR spectrum thereof.

The β-form PVDF-based resin is arranged such that the PVDF-based resin is made of a polymer containing a PVDF skeleton. The PVDF skeleton has a conformation in which molecular chains including a main-chain carbon atom adjacent to two carbon atoms bonded to a fluorine atom and a hydrogen atom, respectively, each having a trans configuration (TT-type conformation), that is, the fluorine atom and the hydrogen atom which are bonded to the respective two carbon atoms are positioned oppositely at an angle of 180° as viewed in the direction of the carbon-carbon bond.

The β-form PVDF-based resin can be arranged such that the PVDF skeleton contained in the polymer of the PVDF-based resin has a TT-type conformation in its entirety. The β-form PVDF-based resin can alternatively be arranged such that the PVDF skeleton partially has the TT-type conformation and has a molecular chain of the TT-type conformation in at least four consecutive PVDF monomeric units. In any of the above cases, (i) the carbon-carbon bond, in which the TT-type conformation constitutes a TT-type main chain, has a planar zigzag structure, and (ii) the respective dipole moments of the C—$F_2$ and C—$H_2$ bonds each have a component perpendicular to the molecular chain.

The β-form PVDF-based resin has a characteristic peak at around −95 ppm in a $^{19}$F-NMR spectrum thereof.

(Method of Calculating Respective Percentages of α-Form PVDF-Based Resin and β-Form PVDF-Based Resin Each Contained in PVDF-Based Resin)

Respective percentages of the α-form PVDF-based resin and the β-form PVDF-based resin, each contained in the porous layer of an embodiment of the present invention, with respect to 100 mol % of the total amount of the α-form PVDF-based resin and the β-form PVDF-based resin can be calculated from the a $^{19}$F-NMR spectrum obtained from the porous layer. Specifically, the percentages of the α-form PVDF-based resin and the β-form PVDF-based resin can be calculated by, for example, the following method.

(1) From a porous layer containing a PVDF-based resin, a $^{19}$F-NMR spectrum is obtained under the following conditions.

Measurement Conditions

Measurement device: AVANCE400 manufactured by Bruker Biospin

Measurement method: Single-pulse method

Observed nucleus: $^{19}$F

Spectral bandwidth: 100 kHz

Pulse width: 3.0 s (90° pulse)

Pulse repetition time: 5.0 s

Reference material: $C_6F_6$ (external reference: −163.0 ppm)

Temperature: 22° C.

Sample rotation frequency: 25 kHz (2) An integral value of a peak at around −78 ppm in the $^{19}$F-NMR spectrum obtained in (1) is calculated and is regarded as an α/2 amount.

(3) As in the case of (2), an integral value of a peak at around −95 ppm in the $^{19}$F-NMR spectrum obtained in (1) is calculated and is regarded as an {(α/2)+β} amount.

(4) A percentage of the α-form PVDF-based resin contained in the porous layer (this percentage is hereinafter also referred to as an α ratio) with respect to 100 mol % of a total amount of the α-form PVDF-based resin and the β-form PVDF-based resin is calculated, from the integral values obtained in (2) and (3), based on the following equation (1):

$$\alpha \text{ ratio(mol \%)} = [(\text{integral value at around } -78 \text{ ppm}) \times 2/\{(\text{integral value at around } -95 \text{ ppm}) + (\text{integral value at around } -78 \text{ ppm})\}] \times 100 \quad (1)$$

(5) A percentage of the β-form PVDF-based resin contained in the porous layer (this percentage is hereinafter also referred to as a β ratio) with respect to 100 mol % of the total amount of the α-form PVDF-based resin and the β-form PVDF-based resin is calculated, from a value of the α ratio obtained in (4), based on the following equation (2):

$$\beta \text{ ratio(mol \%)} = 100 (\text{mol \%}) - \alpha \text{ ratio(mol \%)} \quad (2)$$

(Method for Producing Porous Layer and Nonaqueous Electrolyte Secondary Battery Laminated Separator)

The porous layer of an embodiment of the present invention and a nonaqueous electrolyte secondary battery laminated separator each can be produced by a method that is not limited to any particular method but can be any of various methods.

For example, a porous layer containing a PVDF-based resin and optionally a filler is formed, through one of the steps (1) through (3) below, on a surface of a porous film to serve as a base material. The steps (2) and (3) each further involve drying a deposited porous layer so as to remove a solvent. Note that a coating solution that is used to produce the porous layer containing a filler and is used in each of the steps (1) through (3) is preferably a coating solution in which the filler is dispersed and in which the PVDF-based resin is dissolved.

The coating solution which is used in the method for producing the porous layer of an embodiment of the present invention can be prepared normally by (i) dissolving, in a solvent, a resin contained in the porous layer and (ii) dispersing, in a resultant solution, a filler contained in the porous layer.

(1) Step of forming a porous layer by (i) coating a porous film with a coating solution containing a PVDF-based resin and optionally a filler of each of which the porous layer is formed, and then (ii) drying the coating solution so as to remove a solvent (dispersion medium) contained in the coating solution.

(2) Step of depositing a porous layer by (i) coating a surface of the porous film with the coating solution mentioned in the step (1), and then (ii) immersing the porous film in a deposition solvent, which is a poor solvent with respect to the PVDF-based resin.

(3) Step of depositing a porous layer by (i) coating a surface of the porous film with the coating solution mentioned in the step (1), and then (ii) making the coating solution acidic with use of a low-boiling organic acid.

Examples of the solvent (dispersion medium) contained in the coating solution include N-methylpyrrolidone, N,N-dimethylacetamide, N,N-dimethylformamide, acetone, and water.

The deposition solvent is preferably isopropyl alcohol or t-butyl alcohol, for example.

In the step (3), the low-boiling organic acid can be, for example, paratoluene sulfonic acid or acetic acid.

Note that the base material can be not only a porous film but also any of a film different from the porous film, a positive electrode plate, and a negative electrode plate.

The coating solution can appropriately contain an additive(s) such as a dispersing agent, a plasticizing agent, a surface active agent, and a pH adjusting agent as a component(s) different from the resin and the filler.

The coating solution can be applied to the porous film by a conventionally publicly known method that is specifically exemplified by a gravure coater method, a dip coater method, a bar coater method, and a die coater method.

(Method for Controlling Crystal Forms of PVDF-Based Resin)

Crystal forms of the PVDF-based resin contained in the porous layer of an embodiment of the present invention can be controlled by adjusting drying conditions under which to carry out the above-described method (e.g., the drying temperature, and the air velocity and direction during drying), and/or the deposition temperature at which a porous layer containing a PVDF-based resin is deposited with use of a deposition solvent or a low-boiling organic acid.

The drying conditions and the deposition temperature, which are adjusted so that the PVDF-based resin contains an α-form PVDF-based resin in an amount of not less than 35.0 mol % with respect to 100 mol % of a total amount of the α-form PVDF-based resin and a β-form PVDF-based resin contained in the PVDF-based resin, can be changed as appropriate by changing, for example, the method for producing the porous layer, a kind of solvent (dispersion medium) to be used, a kind of deposition solvent to be used, and/or a kind of low-boiling organic acid to be used.

In a case where the coating solution is simply dried as in the step (1), the drying conditions can be changed as appropriate by adjusting, for example, the amount of the solvent in the coating solution, the concentration of the PVDF-based resin in the coating solution, the amount of the filler (if contained), and/or the amount of the coating solution applied.

In a case where the porous layer is formed through the step (1), it is preferable that the drying temperature be 30° C. to 100° C., that hot air blow, during drying, perpendicularly to a porous base material or an electrode sheet to which the coating solution has been applied, and that the hot air blow at a velocity of 0.1 m/s to 40 m/s.

Specifically, in a case where a coating solution to be applied contains N-methyl-2-pyrrolidone as the solvent for dissolving the PVDF-based resin, 1.0% by mass of the PVDF-based resin, and 9.0% by mass of alumina as the inorganic filler, the drying conditions are preferably adjusted so that (i) the drying temperature is 40° C. to 100° C., (ii) hot air blows, during drying, perpendicularly to the porous base material or the electrode sheet to which the coating solution has been applied, and (iii) the hot air blows at a velocity of 0.4 m/s to 40 m/s.

In a case where the porous layer is formed through the step (2), it is preferable that the deposition temperature be −25° C. to 60° C. and that the drying temperature be 20° C. to 100° C. Specifically, in a case where the porous layer is formed through the step (2) with use of N-methylpyrrolidone as the solvent for dissolving the PVDF-based resin and isopropyl alcohol as the deposition solvent, it is preferable that the deposition temperature be −10° C. to 40° C. and that the drying temperature be 30° C. to 80° C.

(Another Porous Layer)

The nonaqueous electrolyte secondary battery in accordance with an embodiment of the present invention can include another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer can be provided in any order with respect to the nonaqueous electrolyte secondary battery separator. In a preferable arrangement, the porous film, the another porous layer, and the porous layer containing the PVDF-based resin are disposed in this order. In other words, the another porous layer is provided between the porous film and the porous layer containing the PVDF-based resin. In another preferable arrangement, the another porous layer and the porous layer containing the PVDF-based resin are provided in this order on both surfaces of the porous film.

Further, the another porous layer of an embodiment of the present invention can contain a resin which is exemplified by polyolefins; (meth)acrylate-based resins; fluorine-containing resins (excluding polyvinylidene fluoride-based resins); polyamide-based resins; polyimide-based resins; polyester-based resins; rubbers; resins each having a melting point or a glass transition temperature of not lower than 180° C.; water-soluble polymers; and polycarbonate, polyacetal, and polyether ether ketone.

Of the above resins, polyolefins, (meth)acrylate-based resins, polyamide-based resins, polyester-based resins, and water-soluble polymers are preferable.

Preferable examples of the polyolefins include polyethylene, polypropylene, polybutene, and an ethylene-propylene copolymer.

Examples of the fluorine-containing resins include polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins include fluorine-containing rubber having a glass transition temperature of not higher than 23° C.

Preferable examples of the polyamide-based resins include aramid resins such as aromatic polyamides and wholly aromatic polyamides.

Specific examples of the aramid resins include poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Of the above aramid resins, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Note that the above resins each of which is to be contained in the another porous layer can be used in one kind or in combination of two or more kinds.

The other characteristics (e.g., thickness) of the another porous layer are similar to those (of the porous layer) described above, except that the porous layer contains the PVDF-based resin.

<Positive Electrode Plate>

The positive electrode plate of the nonaqueous electrolyte secondary battery in accordance with an embodiment of the present invention is not limited to any particular positive electrode plate provided that the positive electrode plate has a capacitance of not less than 1 nF and not more than 1000 nF per measurement area of 900 $mm^2$. For example, as a positive electrode active material layer, a sheet-shaped positive electrode plate is used which includes (i) a positive electrode mix containing a positive electrode active material, an electrically conductive agent, and a binding agent and (ii) a positive electrode current collector supporting the positive electrode mix thereon. Note that the positive electrode plate can be arranged such that the positive electrode current collector supports positive electrode mixes on respective both surfaces of the positive electrode current collector or can be alternatively arranged such that the positive electrode current collector supports the positive electrode mix on one surface of the positive electrode current collector.

Examples of the positive electrode active material include materials each capable of being doped with and dedoped of lithium ions. Specific examples of such a material include a lithium complex oxide containing at least one of transition metals such as V, Mn, Fe, Co, and Ni.

Examples of the electrically conductive agent include carbonaceous materials such as natural graphite, artificial graphite, cokes, carbon black, pyrolytic carbons, carbon fiber, and a fired product of an organic polymer compound. These electrically conductive agents can be used in one kind or in combination of two or more kinds.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene; acrylic resins; and styrene-butadiene rubber. The binding agent functions also as a thickening agent.

Examples of the positive electrode current collector include electric conductors such as Al, Ni, and stainless steel. Of these electric conductors, Al is more preferable because Al is easily processed into a thin film and is inexpensive.

Examples of a method for producing the sheet-shaped positive electrode plate include a method in which a positive electrode active material, an electrically conductive agent, and a binding agent are pressure-molded on a positive electrode current collector; and a method in which (i) a positive electrode active material, an electrically conductive agent, and a binding agent are formed into a paste with use of a suitable organic solvent, (ii) a positive electrode current collector is coated with the paste, and then (iii) the paste is dried and then pressured so as to be firmly fixed to the positive electrode current collector.

<Negative Electrode Plate>

The negative electrode plate of the nonaqueous electrolyte secondary battery in accordance with an embodiment of the present invention is not limited to any particular negative electrode plate provided that the negative electrode plate has a capacitance of not less than 4 nF and not more than 8500 nF per measurement area of 900 mm². For example, as a negative electrode active material layer, a sheet-shaped negative electrode plate is used which includes (i) a negative electrode mix containing a negative electrode active material and (ii) a negative electrode current collector supporting the negative electrode mix thereon. The sheet-shaped negative electrode plate preferably contains the above electrically conductive agent and the above binding agent. Note that the negative electrode plate can be arranged such that the negative electrode current collector supports negative electrode mixes on respective both surfaces of the negative electrode current collector or can be alternatively arranged such that the negative electrode current collector supports the negative electrode mix on one surface of the negative electrode current collector.

Examples of the negative electrode active material include (i) materials each capable of being doped with and dedoped of lithium ions, (ii) lithium metals, and (iii) lithium alloys. Examples of such a material include a carbonaceous material. Examples of the carbonaceous material include natural graphite, artificial graphite, cokes, carbon black, and pyrolytic carbons. The sheet-shaped negative electrode plate can contain an electrically conductive agent and a binding agent which are mentioned as the electrically conductive agent and the binding agent, respectively, each of which can be contained in the positive electrode active material layer.

Examples of the negative electrode current collector include electric conductors such as Cu, Ni, and stainless steel. Of these electric conductors, Cu is preferable because Cu is not easily alloyed with lithium particularly in a lithium-ion secondary battery and is easily processed into a thin film.

Examples of a method for producing the sheet-shaped negative electrode plate include a method in which a negative electrode active material is pressure-molded on a negative electrode current collector; and a method in which (i) a negative electrode active material is formed into a paste with use of a suitable organic solvent, (ii) a negative electrode current collector is coated with the paste, and then (iii) the paste is dried and then pressured so as to be firmly fixed to the negative electrode current collector. The paste preferably contains the electrically conductive agent and the binding agent.

<Nonaqueous Electrolyte>

A nonaqueous electrolyte that can be contained in the nonaqueous electrolyte secondary battery in accordance with an embodiment of the present invention is not limited to any particular nonaqueous electrolyte provided that the nonaqueous electrolyte is a nonaqueous electrolyte for common use in a nonaqueous electrolyte secondary battery. The nonaqueous electrolyte can be, for example, a nonaqueous electrolyte containing an organic solvent and a lithium salt dissolved in the organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. These lithium salts can be used in one kind or in combination of two or more kinds.

Examples of the organic solvent which is contained in the nonaqueous electrolyte include carbonates, ethers, esters, nitriles, amides, carbamates, and sulfur-containing compounds, and fluorine-containing organic solvents each obtained by introducing a fluorine group into any of these organic solvents. These organic solvents can be used in one kind or in combination of two or more kinds.

<Method for Producing Nonaqueous Electrolyte Secondary Battery>

The nonaqueous electrolyte secondary battery in accordance with an embodiment of the present invention can be produced by, for example, (i) forming a member for a nonaqueous electrolyte secondary battery (hereinafter referred to as a nonaqueous electrolyte secondary battery member) by providing the positive electrode plate, the porous layer, the nonaqueous electrolyte secondary battery separator, and the negative electrode plate in this order, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure.

As described earlier, a nonaqueous electrolyte secondary battery in accordance with an embodiment of the present invention includes: a nonaqueous electrolyte secondary battery separator including a polyolefin porous film; a porous layer; a positive electrode plate; and a negative electrode plate. In particular, the nonaqueous electrolyte secondary battery in accordance with an embodiment of the present invention satisfies the following requirements (i) through (iv):

(i) the requirement that the porous film has a piercing strength of not less than 26.0 gf/g/m², the piercing strength being measured with respect to a weight per unit area of the polyolefin porous film, and the polyolefin porous film has a value in a range of 0.00 to 0.54, the value being represented by the following Expression (1):

$$|1 - T/M| \quad (1)$$

(ii) the requirement that a polyvinylidene fluoride-based resin contained in the porous layer contains an α-form polyvinylidene fluoride-based resin in an amount of not less than 35.0 mol % with respect to 100 mol % of a total amount of the α-form polyvinylidene fluoride-based resin and a β-form polyvinylidene fluoride-based resin contained in the porous layer;

(iii) the requirement that the positive electrode plate has a capacitance of not less than 1 nF and not more than 1000 nF per measurement area of 900 mm²; and (iv) the requirement that the negative electrode plate has a capacitance of not less than 4 nF and not more than 8500 nF per measurement area of 900 mm².

According to the nonaqueous electrolyte secondary battery in accordance with an embodiment of the present invention which nonaqueous electrolyte secondary battery satisfies the requirement (i), it is possible to not only sufficiently prevent a short circuit between the positive electrode and the negative electrode but also restrain (a) deformation, caused by charge and discharge of the nonaqueous electrolyte secondary battery, of a pore structure inside the nonaqueous electrolyte secondary battery separator and (b) deformation, caused by charge and discharge of the nonaqueous electrolyte secondary battery, of a structure of an interface between the nonaqueous electrolyte secondary battery separator or the nonaqueous electrolyte secondary battery laminated separator and the electrode.

Furthermore, according to the nonaqueous electrolyte secondary battery in accordance with an embodiment of the present invention which nonaqueous electrolyte secondary battery satisfies the requirement (ii), the porous layer shows excellent structural stability after the nonaqueous electrolyte secondary battery is charged and discharged under a high rate condition.

Moreover, satisfaction of the requirements (iii) and (iv) allows both a polarization state of the positive electrode active material layer of the positive electrode plate and a polarization state of the negative electrode active material layer of the negative electrode plate to be suitable. Satisfaction of the requirements (iii) and (iv) also makes it possible to promote solvation of cations to an electrolyte solvent in the negative electrode plate and in a place where the negative electrode plate and the nonaqueous electrolyte secondary battery separator are in contact with each other, and to promote desolvation of the cations from the electrolyte solvent in the positive electrode plate and in a place where the positive electrode plate and the nonaqueous electrolyte secondary battery separator are in contact with each other. This enhances cation permeability.

Thus, the nonaqueous electrolyte secondary battery which satisfies the above requirements (i) through (iv), (a) makes it possible to restrain deformation, caused by charge and discharge of the nonaqueous electrolyte secondary battery, of a structure of an interface between the nonaqueous electrolyte secondary battery separator or the nonaqueous electrolyte secondary battery laminated separator and the electrode, and consequently to restrain a deterioration in performance of the nonaqueous electrolyte secondary battery. Furthermore, the nonaqueous electrolyte secondary battery which satisfies the above requirements (i) through (iv) (b) allows the porous layer to show excellent structural stability after the nonaqueous electrolyte secondary battery is charged and discharged under a high rate condition, and also (c) allows both the polarization state of the positive electrode active material layer of the positive electrode plate and the polarization state of the negative electrode active material layer of the negative electrode plate to be suitable. This allows the nonaqueous electrolyte secondary battery in accordance with an embodiment of the present invention to have a higher charge capacity during charge at 1 C after high-rate battery discharge (discharge at 20 C).

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will more specifically discuss the present invention with reference to Examples and Comparative Examples. Note, however, that the present invention is not limited to the Examples.

[Measurement Method]

Measurements were carried out in Examples and Comparative Examples by the method below.

(1) Thickness of Active Material Layer (Unit: μm)

A thickness of each a positive electrode active material layer and a negative electrode active material layer was measured with use of a high-resolution digital measuring device (VL-50) manufactured by Mitutoyo Corporation. Note, however, that the thickness of the positive electrode active material layer was calculated by subtracting a thickness of aluminum foil, serving as a current collector, from a thickness of the positive electrode plate. Note also that the thickness of the negative electrode active material layer was calculated by subtracting a thickness of copper foil, serving as a current collector, from a thickness of the negative electrode plate.

(2) Piercing Strength with Respect to Weight Per Unit Area of Porous Film (Unit: $gf/(g/m^2)$)

A porous film material was fixed with a washer of 12 mmφ by use of a handy-type compression tester (manufactured by KATO TECH CO., LTD.; model number KES-G5). A maximum stress (gf) obtained by piercing the porous film material with a pin at 200 mm/min was defined as a piercing strength of the porous film material. The pin used had a pin diameter of 1 mmφ and a tip radius of 0.5 R.

(3) Scratch Test

A critical load value and a ratio of a critical load distance in a transverse direction to a critical load distance in a machine direction were measured by a scratch test. Any conditions and the like that are different from the conditions described above and under which to carry out the measurement are similar to those disclosed in JIS R 3255. The measurement was carried out with use of a microscratch testing device (manufactured by CSEM Instruments).

(3-1) Porous films produced in Examples and Comparative Examples were each cut into a piece of 20 mm×60 mm. Then, the piece of the porous film and a glass preparation of 30 mm×70 mm were combined with use of aqueous glue. Then, the piece and the glass preparation thus combined were dried at a temperature of 25° C. for one whole day and night, so that a test sample was produced. Note that the piece of the porous film and the glass preparation were combined, by thinly applying, to the piece of the porous film, a small amount of aqueous glue that would not permeate into the piece of the porous film, so that no air bubbles were made between the piece of the porous film and the glass preparation.

(3-2) The test sample prepared in the step (3-1) was placed on a microscratch testing device (manufactured by CSEM Instruments). Then, while a diamond indenter of the testing device was applying a vertical load of 0.1 N to the test sample, a table of the testing device was moved by a distance of 10 mm in a transverse direction of the porous film at a speed of 5 mm/min. During the movement of the table, a stress (force of friction) that occurred between the diamond indenter and the test sample was measured.

(3-3) A line graph was made which shows a relationship between displacement of the stress measured in the step (3-2) and the distance of the movement of the table. Then, based on the line graph, (i) a critical load value in the transverse direction and (ii) a distance in the transverse direction at which distance a critical load is reached were calculated.

(3-4) The direction in which the table is moved was changed to a machine direction, and the above steps (3-1) through (3-3) were repeatedly carried out so that (i) a critical load value in the machine direction and (ii) a distance in the machine direction at which distance a critical load is reached were calculated.

(4) α Ratio Calculation Method

A laminated body piece having a size of approximately 2 cm×5 cm was cut out from a laminated body produced in each of Examples and Comparative Examples below. In accordance with the steps (1) through (4) of the above (Method of calculating respective percentages of α-form PVDF-based resin and β-form PVDF-based resin each contained in PVDF-based resin), a percentage (α ratio) of an α-form PVDF-based resin contained in a PVDF-based resin was measured.

(5) Measurement of Capacitance of Electrode Plate

A capacitance per measurement area of 900 mm² of each of a positive electrode plate and a negative electrode plate, each obtained in each of Examples and Comparative Examples, was measured with use of an LCR meter (model number: IM3536) manufactured by HIOKI E.E. CORPORATION. The measurement was carried out at a frequency of 300 KHz and under conditions set as follows: CV: 0.010 V, SPEED: SLOW2, AVG: 8, CABLE: 1 m, OPEN: All, SHORT: All DCBIAS 0.00 V. An absolute value of the capacitance thus measured was regarded as a capacitance in Examples and Comparative Examples.

From an electrode plate which was a measurement target, a single piece was cut off so that the single piece had (i) a first part which had a 3 cm×3 cm square shape and on which an electrode mix was disposed and (ii) a second part which had a 1 cm×1 cm square shape and on which no electrode mix was disposed. To the second part of the single piece thus cut off from the electrode plate, a lead wire having a length of 6 cm and a width of 0.5 cm was ultrasonically welded so that an electrode plate whose capacitance was to be measured was obtained (FIG. 1). An aluminum lead wire was used for the positive electrode plate, and a nickel lead wire was used for the negative electrode plate.

Figure 2:
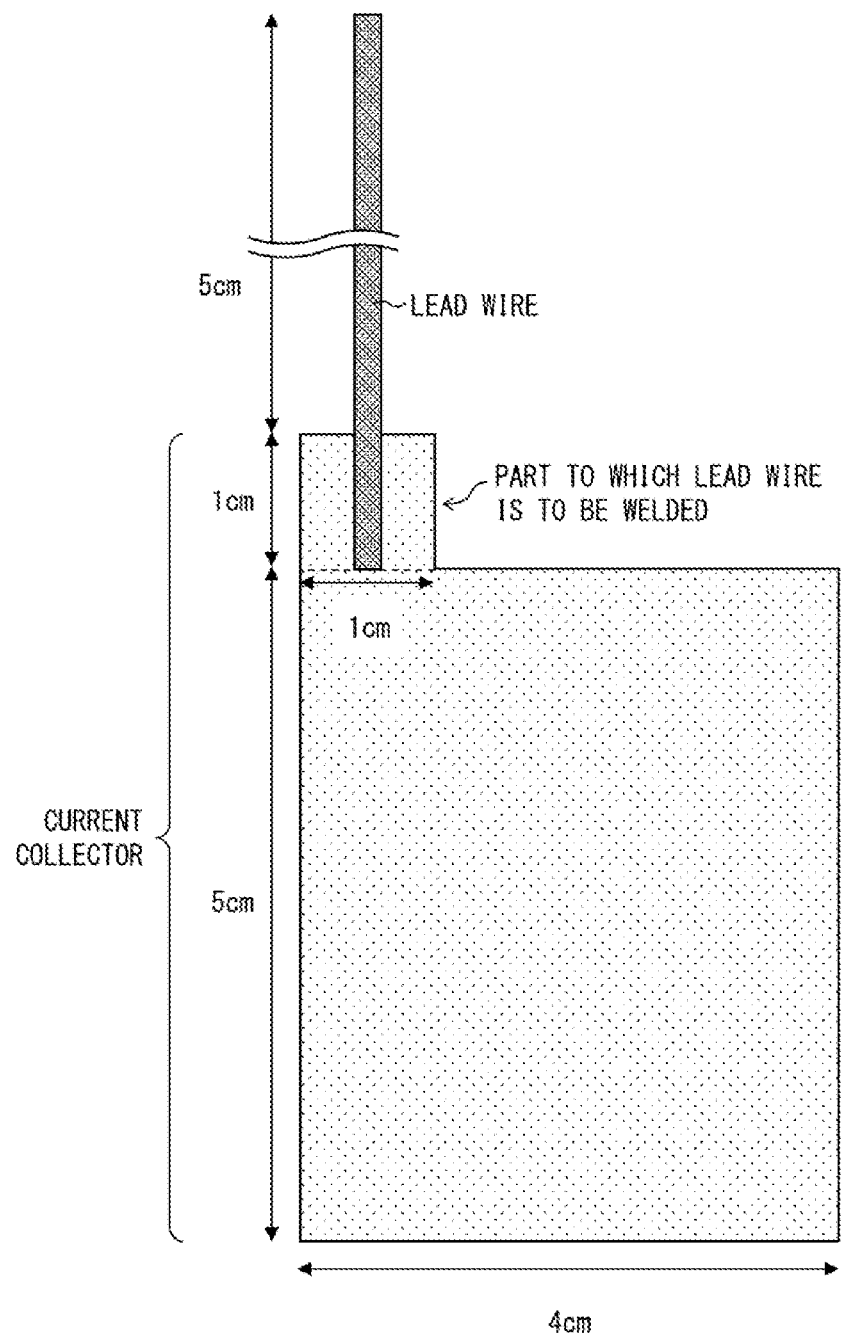
FIG. 2 is a view schematically illustrating a probe electrode which was used to measure the capacitance in Examples of the present application.

From a current collector, a single piece was cut off so that the single piece had (i) a first part which had a 5 cm×4 cm rectangular shape and (ii) a second part which had a 1 cm×1 cm square shape and to which a lead wire was to be welded. To the second part of the single piece thus cut off from the current collector, a lead wire having a length of 6 cm and a width of 0.5 cm was ultrasonically welded so that a probe electrode (measurement electrode) was obtained (FIG. 2). An aluminum probe electrode having a thickness of 20 μm was used to measure the capacitance of the positive electrode plate, and a copper probe electrode having a thickness of 20 μm was used to measure the capacitance of the negative electrode plate.

The probe electrode was laid on top of the first part (part having a 3 cm×3 cm square shape) of the electrode plate, whose capacitance was to be measured, so that a laminated body was produced. The laminated body thus obtained was sandwiched between two sheets of silicon rubber. A resultant laminated body was further sandwiched between two SUS plates under a pressure of 0.7 MPa so that a laminated body which was to be subjected to the measurement was obtained. The lead wire of the electrode plate, whose capacitance was to be measured, and the lead wire of the probe electrode were drawn outside the laminated body which was to be subjected to the measurement. Each of a voltage terminal and an electric current terminal of the LCR meter was connected to those lead wires so that the voltage terminal was closer to the electrode plate than the electric current terminal.

(6) Measurement of Porosity of Positive Electrode Active Material Layer

A porosity of a positive electrode active material layer included in a positive electrode plate of Example 1 below was measured by the method below. A porosity of a positive electrode active material layer included in each of the other positive electrode plates of the other Examples below was also measured by a similar method.

A positive electrode plate in which a positive electrode mix (a mixture of $LiNi_{0.5}Mn_{0.3}Co_{0.2}O_2$, an electrically conductive agent, and PVDF (at a weight ratio of 92:5:3)) was disposed on one surface of a positive electrode current collector (aluminum foil) was cut so that a piece having a size of 14.5 cm² (4.5 cm×3 cm+1 cm×1 cm) was obtained. A resultant cut piece of the positive electrode plate had a mass of 0.215 g and a thickness of 58 μm. The positive electrode current collector was cut so that a piece having the same size as the cut piece of the positive electrode plate was obtained. A resultant cut piece of the positive electrode current collector had a mass of 0.078 g and a thickness of 20 μm.

A density ρ of such a positive electrode active material layer was calculated as $(0.215-0.078)/\{(58-20)/10000\times 14.5\}=2.5$ g/cm³.

Each of materials contained in the positive electrode mix had a true density as below. Specifically, the $LiNi_{0.5}Mn_{0.3}Co_{0.2}O_2$ had a true density of 4.68 g/cm³, the electrically conductive agent had a true density of 1.8 g/cm³, and the PVDF had a true density of 1.8 g/cm³.

The positive electrode active material layer had a porosity ε of 40%, which was calculated, from the above values, based on the following expression:

$$\varepsilon=[1-\{2.5\times(92/100)/4.68+2.5\times(5/100)/1.8+2.5\times(3/100)/1.8\}]\times100=40\%$$

(7) Measurement of Porosity of Negative Electrode Active Material Layer

A porosity of a negative electrode active material layer included in a negative electrode plate of Example 1 below was measured by the method below. A porosity of a negative electrode active material layer included in each of the other negative electrode plates of the other Examples below was also measured by a similar method.

A negative electrode plate in which a negative electrode mix (a mixture of graphite, a styrene-1,3-butadiene copolymer, and sodium carboxymethyl cellulose (at a weight ratio of 98:1:1)) was disposed on one surface of a negative electrode current collector (copper foil) was cut so that a piece having a size of 18.5 cm² (5 cm×3.5 cm+1 cm×1 cm) was obtained. A resultant cut piece of the negative electrode plate had a mass of 0.266 g and a thickness of 48 μm. The negative electrode current collector was cut so that a piece having the same size as the cut piece of the negative electrode plate was obtained. A resultant cut piece of the negative electrode current collector had a mass of 0.162 g and a thickness of 10 μm.

A density ρ of such a negative electrode active material layer was calculated as $(0.266-0.162)/\{(48-10)/10000\times 18.5\}=1.49$ g/cm³.

Each of materials contained in the negative electrode mix had a true density as below. Specifically, the graphite had a true density of 2.2 g/cm³, the styrene-1,3-butadiene copolymer had a true density of 1 g/cm³, and the sodium carboxymethyl cellulose had a true density of 1.6 g/cm³.

The negative electrode active material layer had a porosity ε of 31%, which was calculated, from the above values, based on the following expression:

$$\varepsilon=[1-\{1.49\times(98/100)/2.2+1.49\times(1/100)/1+1.49\times(1/100)/1.6\}]\times100=31\%$$

(8) Battery Characteristic of Nonaqueous Electrolyte Secondary Battery

A charge capacity characteristic obtained after a nonaqueous electrolyte secondary battery (having a design capacity of 20.5 mAh) produced in each of Examples and Comparative Examples had been subjected high-rate discharge was measured by a method including the following steps (A) and (B).

(A) Initial Charge and Discharge Test

A new nonaqueous electrolyte secondary battery which had been produced in each of Examples and Comparative Examples and which had not been subjected to any charge and discharge cycle was subjected to 4 initial charge and discharge cycles at 25° C. Each of the 4 initial charge and discharge cycles was carried out under the condition that a voltage ranged from 2.7 V to 4.1 V, CC-CV charge was carried out at a charge current value of 0.2 C (terminal current condition: 0.02 C), and CC discharge was carried out at a discharge current value of 0.2 C. Note that 1 C is defined as a value of an electric current at which a rated capacity based on a discharge capacity at 1 hour rate is discharged in 1 hour. Same applies to the following description. Note that the CC-CV charge is a charging method in which a battery is charged at a set constant electric current, and after a given voltage is reached, the given voltage is maintained while the electric current is reduced. Note also that the CC discharge is a discharging method in which a battery is discharged at a set constant electric current until a given voltage is reached. Same applies to the following description.

(B) Charge Capacity Characteristic After High-Rate Discharge (mAh)

The nonaqueous electrolyte secondary battery which had been subjected to the initial charge and discharge was subjected to charge and discharge cycles under the condition that (i) a temperature was set at 55° C., (ii) CC-CV charge was carried out at a rate of 1 C (final rate: 0.02 C), and (iii) CC discharge was carried out such that a rate was set to 0.2 C first and then the rate was changed to 1 C, 5 C, and 10 C in this order every three charge and discharge cycles. The charge and discharge cycles were carried out at a voltage in a range of 2.7 V to 4.2 V.

A charge capacity obtained during charge at 1 C in the third one of the three charge and discharge cycles in which discharge at 20 C was carried out was regarded as a charge capacity after high-rate discharge (mAh), which is shown in Table 1.

Example 1

[Production of Nonaqueous Electrolyte Secondary Battery Laminated Separator]

Ultra-high molecular weight polyethylene powder (GUR4032, manufactured by Ticona Corporation) having a weight-average molecular weight of 4,970,000 and polyethylene wax (FNP-0115, manufactured by Nippon Seiro Co., Ltd.) having a weight-average molecular weight of 1,000 were mixed so as to prepare a mixture containing the ultra-high molecular weight polyethylene powder in an amount of 70% by weight and the polyethylene wax in an amount of 30% by weight. Assuming that the ultra-high molecular weight polyethylene powder and the polyethylene wax of the mixture had 100 parts by weight in total, to the 100 parts by weight of the mixture, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added, and then calcium carbonate (manufactured by Maruo Calcium Co., Ltd.) having an average particle diameter of 0.1 µm was further added so as to account for 36% by volume of a total volume of a resultant mixture. Then, the resultant mixture was mixed as it was, that is, in a form of powder, in a Henschel mixer, so that a mixture 1 was obtained.

Then, the mixture 1 was melted and kneaded in a twin screw kneading extruder, so that a polyolefin resin composition 1 was obtained. Then, the polyolefin resin composition 1 was rolled with use of a roller at a circumferential velocity of 3.0 m/min, so that a rolled sheet was produced. Subsequently, the rolled sheet 1 was immersed in an aqueous hydrochloric acid solution (containing 4 mol/L of hydrochloric acid and 0.5% by weight of a nonionic surface active agent) so that the calcium carbonate was removed from the rolled sheet 1. Then, the rolled sheet was stretched at 105° C. at a stretch ratio of 6.2 times (ratio of stretch temperature to stretch ratio=16.9). Furthermore, the rolled sheet was subjected to heat fixation at 120° C., so that a porous film 1 was obtained. The porous film 1 obtained had a weight per unit area of 6.9 g/m$^2$.

An N-methyl-2-pyrrolidone (hereinafter also referred to as "NMP") solution (manufactured by Kureha Corporation; product name: "L #9305", weight-average molecular weight: 1,000,000) containing a PVDF-based resin (polyvinylidene fluoride-hexafluoropropylene copolymer) was prepared as a coating solution 1. The coating solution 1 was applied to the porous film 1 by a doctor blade method so that the PVDF-based resin contained in the coating solution 1 which had been applied to the porous film 1 weighed 6.0 g per square meter of the porous film 1.

A resultant coated product was immersed in 2-propanol while a coated film thereof was wet with a solvent contained in the coating solution, and then was left to stand still at −10° C. for 5 minutes, so that a laminated porous film 1 was obtained. The laminated porous film 1 obtained was further immersed in other 2-propanol while being wet with the above immersion solvent, and then was left to stand still at 25° C. for 5 minutes, so that a laminated porous film 1a was obtained. The laminated porous film 1a obtained was dried at 30° C. for 5 minutes, so that a laminated separator 1 was produced. Table 1 shows results of evaluation of the laminated separator 1 produced.

[Production of Nonaqueous Electrolyte Secondary Battery]

(Production of Positive Electrode Plate)

A positive electrode plate was used which had been produced by applying a mixture of $LiNi_{0.5}Mn_{0.3}Co_{0.2}O_2$, an electrically conductive agent, and PVDF (at a weight ratio of 92:5:3) to aluminum foil. The aluminum foil of the positive electrode plate was cut off so that a cut piece of the aluminum foil had (i) a first part, on which a positive electrode active material layer was disposed, had a size of 45 mm×30 mm and (ii) a second part, on which no positive electrode active material layer was disposed, had a width of 13 mm and remained so as to surround the first part. A positive electrode plate 1 was thus obtained. The positive electrode active material layer had a thickness of 38 µm and a density of 2.50 g/cm$^3$.

(Production of Negative Electrode Plate)

A negative electrode plate was used which had been produced by applying a mixture of graphite, a styrene-1,3-butadiene copolymer, and sodium carboxymethylcellulose (at a weight ratio of 98:1:1) to copper foil.

The copper foil of the negative electrode plate was cut off so that a cut piece of the copper foil had (i) a first part, on which a negative electrode active material layer was disposed, had a size of 50 mm×35 mm and (ii) a second part, on which no negative electrode active material layer was disposed, had a width of 13 mm and remained so as to surround the first part. A negative electrode plate 1 was thus obtained. The negative electrode active material layer had a thickness of 38 μm and a density of 1.49 g/cm³.

(Assembly of Nonaqueous Electrolyte Secondary Battery)

The positive electrode plate 1, the negative electrode plate 1, and the laminated separator 1 were used to produce a nonaqueous electrolyte secondary battery by the following method.

(i) The positive electrode plate 1, (ii) the laminated separator 1 including a porous layer provided so as to face the positive electrode plate 1, and (iii) the negative electrode plate 1 were disposed on top of each other (provided) in this order in a laminate pouch, so that a nonaqueous electrolyte secondary battery member 1 was obtained. In this case, the positive electrode plate 1 and the negative electrode plate 1 were provided so that a whole of a main surface of the positive electrode active material layer of the positive electrode plate 1 was included in a range of a main surface (overlapped the main surface) of the negative electrode active material layer of the negative electrode plate 1.

Subsequently, the nonaqueous electrolyte secondary battery member 1 was put into a bag which had been made, in advance, of a laminate of an aluminum layer and a heat seal layer. Further, 0.25 mL of nonaqueous electrolyte was put into the bag. The above nonaqueous electrolyte was prepared by dissolving LiPF$_6$ in a mixed solvent of ethylene carbonate, ethyl methyl carbonate, and diethyl carbonate at a ratio (volume ratio) of 3:5:2 so that the LiPF$_6$ was contained at 1 mol/L. Then, the bag was heat-sealed while the pressure inside the bag was reduced, so that a nonaqueous electrolyte secondary battery 1 was produced.

Thereafter, a charge capacity after high-rate discharge of the nonaqueous electrolyte secondary battery 1 was measured by the method described in the above (8) Battery characteristic of nonaqueous electrolyte secondary battery. Table 1 shows results of the measurement.

Example 2

[Production of Nonaqueous Electrolyte Secondary Battery Laminated Separator]

Example 2 prepared a polyolefin resin composition 2 as in the case of Example 1 except that Example 2 (i) used (a) ultra-high molecular weight polyethylene powder (GUR4032, manufactured by Ticona Corporation), having a weight-average molecular weight of 4,970,000, in an amount of 72% by weight and (b) polyethylene wax (FNP-0115, manufactured by Nippon Seiro Co., Ltd.), having a weight-average molecular weight of 1000, in an amount of 29% by weight and (ii) used calcium carbonate (manufactured by Maruo Calcium Co., Ltd.), having an average pore size of 0.1 μm, so that the calcium carbonate accounted for 37% by amount of a total volume of a resultant mixture.

Subsequently, the polyolefin resin composition 2 was rolled with use of a roller at a circumferential velocity of 4.0 m/min, so that a rolled sheet 2 was produced. Then, Example 2 obtained a porous film 2 as in the case of Example 1 by removing the calcium carbonate from the rolled sheet 2, stretching the rolled sheet 2, and subjecting the rolled sheet 2 to heat fixation, except that Example 2 set the stretch temperature at 100° C., set the stretch ratio at 7.0 times (ratio of stretch temperature to stretch ratio=16.9), and carried out heat fixation at 123° C. The porous film 2 obtained had a weight per unit area of 5.4 g/m².

Example 2 applied the coating solution 1 to the porous film 2 as in the case of Example 1. A resultant coated product was immersed in 2-propanol while a coated film thereof was wet with a solvent contained in the coating solution, and then was left to stand still at −5° C. for 5 minutes, so that a laminated porous film 2 was obtained. The laminated porous film 2 obtained was further immersed in other 2-propanol while being wet with the above immersion solvent, and then was left to stand still at 25° C. for 5 minutes, so that a laminated porous film 2a was obtained. The laminated porous film 2a obtained was dried at 30° C. for 5 minutes, so that a laminated separator 2 was produced. Table 1 shows results of evaluation of the laminated separator 2 produced.

[Production of Nonaqueous Electrolyte Secondary Battery]

Example 2 produced a nonaqueous electrolyte secondary battery as in the case of Example 1 except that Example 2 used the laminated separator 2 instead of the laminated separator 1. The nonaqueous electrolyte secondary battery thus produced was designated as a nonaqueous electrolyte secondary battery 2.

Thereafter, a charge capacity after high-rate discharge of the nonaqueous electrolyte secondary battery 2 was measured by the method described in the above (8) Battery characteristic of nonaqueous electrolyte secondary battery. Table 1 shows results of the measurement.

Example 3

(Production of Positive Electrode Plate)

A surface of a positive electrode plate, identical to the positive electrode plate 1, which surface was located on the positive electrode active material layer side was rubbed 3 times with use of an abrasive cloth sheet (model number: TYPE AA GRIT No. 100) manufactured by Nagatsuka Abrasive Mfg. A positive electrode plate 2 was thus obtained. The positive electrode active material layer of the positive electrode plate 2 had a thickness of 38 μm and a porosity of 40%.

[Production of Nonaqueous Electrolyte Secondary Battery]

Example 3 used the negative electrode plate 1 as a negative electrode plate. Example 3 produced a nonaqueous electrolyte secondary battery as in the case of Example 1 except that Example 3 used the laminated separator 2 instead of the laminated separator 1 and used the positive electrode plate 2 as a positive electrode plate. The nonaqueous electrolyte secondary battery thus produced was designated as a nonaqueous electrolyte secondary battery 3.

Thereafter, a charge capacity after high-rate discharge of the nonaqueous electrolyte secondary battery 3 was measured by the method described in the above (8) Battery characteristic of nonaqueous electrolyte secondary battery. Table 1 shows results of the measurement.

Example 4

(Production of Positive Electrode Plate)

A surface of a positive electrode plate, identical to the positive electrode plate 1, which surface was located on the positive electrode active material layer side was rubbed 5 times with use of an abrasive cloth sheet (model number: TYPE AA GRIT No. 100) manufactured by Nagatsuka Abrasive Mfg. A positive electrode plate 3 was thus obtained. The positive electrode active material layer of the positive electrode plate 3 had a thickness of 38 μm and a porosity of 40%.

[Production of Nonaqueous Electrolyte Secondary Battery]

Example 4 used the negative electrode plate 1 as a negative electrode plate. Example 4 produced a nonaqueous electrolyte secondary battery as in the case of Example 1 except that Example 4 used the laminated separator 2 instead of the laminated separator 1 and used the positive electrode plate 3 as a positive electrode plate. The nonaqueous electrolyte secondary battery thus produced was designated as a nonaqueous electrolyte secondary battery 4.

Thereafter, a charge capacity after high-rate discharge of the nonaqueous electrolyte secondary battery 4 was measured by the method described in the above (8) Battery characteristic of nonaqueous electrolyte secondary battery. Table 1 shows results of the measurement.

Example 5

(Production of Negative Electrode Plate)

A surface of a negative electrode plate, identical to the negative electrode plate 1, which surface was located on the negative electrode active material layer side was rubbed 3 times with use of an abrasive cloth sheet (model number: TYPE AA GRIT No. 100) manufactured by Nagatsuka Abrasive Mfg. A negative electrode plate 2 was thus obtained. The negative electrode active material layer of the negative electrode plate 2 had a thickness of 38 μm and a porosity of 31%.

[Production of Nonaqueous Electrolyte Secondary Battery]

The positive electrode plate 1 was used as a positive electrode plate. Example 5 produced a nonaqueous electrolyte secondary battery as in the case of Example 1 except that Example 5 used the laminated separator 2 instead of the laminated separator 1 and used the negative electrode plate 2 as a negative electrode plate. The nonaqueous electrolyte secondary battery thus produced was designated as a nonaqueous electrolyte secondary battery 5.

Thereafter, a charge capacity after high-rate discharge of the nonaqueous electrolyte secondary battery 5 was measured by the method described in the above (8) Battery characteristic of nonaqueous electrolyte secondary battery. Table 1 shows results of the measurement.

Example 6

(Production of Negative Electrode Plate)

A surface of a negative electrode plate, identical to the negative electrode plate 1, which surface was located on the negative electrode active material layer side was rubbed 7 times with use of an abrasive cloth sheet (model number: TYPE AA GRIT No. 100) manufactured by Nagatsuka Abrasive Mfg. A negative electrode plate 3 was thus obtained. The negative electrode active material layer of the negative electrode plate 3 had a thickness of 38 μm and a porosity of 31%.

[Production of Nonaqueous Electrolyte Secondary Battery]

The positive electrode plate 1 was used as a positive electrode plate. Example 6 produced a nonaqueous electrolyte secondary battery as in the case of Example 1 except that Example 6 used the laminated separator 2 instead of the laminated separator 1 and used the negative electrode plate 3 as a negative electrode plate. The nonaqueous electrolyte secondary battery thus produced was designated as a nonaqueous electrolyte secondary battery 6.

Thereafter, a charge capacity after high-rate discharge of the nonaqueous electrolyte secondary battery 6 was measured by the method described in the above (8) Battery characteristic of nonaqueous electrolyte secondary battery. Table 1 shows results of the measurement.

Example 7

[Production of Porous Layer and Production of Laminated Separator]

A PVDF-based resin (manufactured by Arkema Inc.; product name "Kynar (Registered Trademark) LBG", having a weight-average molecular weight of 590,000) was dissolved, by being stirred at 65° C. over 30 minutes, in N-methyl-2-pyrrolidone so that a solid content in a resultant solution was 10% by mass. The resultant solution was used as a binder solution. As a filler, alumina fine particles (manufactured by Sumitomo Chemical Co., Ltd.; product name "AKP3000", containing 5 ppm of silicon) were used. The alumina fine particles, the binder solution, and a solvent (N-methyl-2-pyrrolidone) were mixed together at the following ratio. That is, the alumina fine particles, the binder solution, and the solvent were mixed together so that (i) a resultant mixed solution contained 10 parts by weight of the PVDF-based resin with respect to 90 parts by weight of the alumina fine particles and (ii) a concentration of a solid content (alumina fine particles+PVDF-based resin) in the mixed solution was 10% by weight. A dispersion solution (coating solution 2) was thus obtained.

The coating solution was applied to the porous film 2, which had been produced in Example 2, by a doctor blade method so that the PVDF-based resin contained in the coating solution 2 which had been applied to the porous film 2 weighed 6.0 g per square meter of the porous film 2. A laminated porous film 3 was thus produced. The laminated porous film 3 was dried at 65° C. for 5 minutes, so that a laminated separator 3 was produced. The laminated porous film was dried by hot air blown perpendicularly to a base material at an air velocity of 0.5 m/s. Table 1 shows results of evaluation of the laminated separator 3 produced.

[Production of Nonaqueous Electrolyte Secondary Battery]

Example 7 produced a nonaqueous electrolyte secondary battery as in the case of Example 1 except that Example 7 used the laminated separator 3 instead of the laminated separator 1. The nonaqueous electrolyte secondary battery thus produced was designated as a nonaqueous electrolyte secondary battery 7.

Thereafter, a charge capacity after high-rate discharge of the nonaqueous electrolyte secondary battery 7 was measured by the method described in the above (8) Battery characteristic of nonaqueous electrolyte secondary battery. Table 1 shows results of the measurement.

Comparative Example 1

(Production of Positive Electrode Plate)

A surface of a positive electrode plate, identical to the positive electrode plate 1, which surface was located on the positive electrode active material layer side was rubbed 10 times with use of an abrasive cloth sheet (model number: TYPE AA GRIT No. 100) manufactured by Nagatsuka Abrasive Mfg. A positive electrode plate 4 was thus obtained. The positive electrode active material layer of the positive electrode plate 4 had a thickness of 38 μm and a porosity of 40%.

[Production of Nonaqueous Electrolyte Secondary Battery]

Comparative Example 1 used the negative electrode plate 1 as a negative electrode plate. Comparative Example 1 produced a nonaqueous electrolyte secondary battery as in the case of Example 1 except that Comparative Example 1 used the laminated separator 2 as a nonaqueous electrolyte secondary battery separator and used the positive electrode plate 4 as a positive electrode plate. The nonaqueous electrolyte secondary battery thus produced was designated as a nonaqueous electrolyte secondary battery 8.

Thereafter, a charge capacity after high-rate discharge of the nonaqueous electrolyte secondary battery 8 was measured by the method described in the above (8) Battery characteristic of nonaqueous electrolyte secondary battery. Table 1 shows results of the measurement.

Comparative Example 2

(Production of Negative Electrode Plate)

A surface of a negative electrode plate, identical to the negative electrode plate 1, which surface was located on the negative electrode active material layer side was rubbed 10 times with use of an abrasive cloth sheet (model number: TYPE AA GRIT No. 100) manufactured by Nagatsuka Abrasive Mfg. A negative electrode plate 4 was thus obtained. The negative electrode active material layer of the negative electrode plate 4 had a thickness of 38 μm and a porosity of 31%.

[Production of Nonaqueous Electrolyte Secondary Battery]

The positive electrode plate 1 was used as a positive electrode plate. Comparative Example 2 produced a nonaqueous electrolyte secondary battery as in the case of Example 1 except that Comparative Example 2 used the laminated separator 2 as a laminated separator and used the negative electrode plate 4 as a negative electrode plate. The nonaqueous electrolyte secondary battery thus produced was designated as a nonaqueous electrolyte secondary battery 9.

Thereafter, a charge capacity after high-rate discharge of the nonaqueous electrolyte secondary battery 9 was measured by the method described in the above (8) Battery characteristic of nonaqueous electrolyte secondary battery. Table 1 shows results of the measurement.

Comparative Example 3

[Production of Nonaqueous Electrolyte Secondary Battery Separator]

A coated product obtained as in the case of the obtainment of the coated product in Example 2 was immersed in 2-propanol while a coated film thereof was wet with a solvent contained in a coating solution, and then was left to stand still at −78° C. for 5 minutes, so that a laminated porous film 4 was obtained. The laminated porous film 4 obtained was further immersed in other 2-propanol while being wet with the above immersion solvent, and then was left to stand still at 25° C. for 5 minutes, so that a laminated porous film 4a was obtained. The laminated porous film 4a obtained was dried at 30° C. for 5 minutes, so that a laminated separator 4 was produced. Table 1 shows results of evaluation of the laminated separator 4 produced.

[Production of Nonaqueous Electrolyte Secondary Battery]

Comparative Example 3 produced a nonaqueous electrolyte secondary battery as in the case of Example 1 except that Comparative Example 3 used the laminated separator 4 as a nonaqueous electrolyte secondary battery separator. The nonaqueous electrolyte secondary battery thus produced was designated as a nonaqueous electrolyte secondary battery 10.

Thereafter, a charge capacity after high-rate discharge of the nonaqueous electrolyte secondary battery 10 was measured by the method described in the above (8) Battery characteristic of nonaqueous electrolyte secondary battery. Table 1 shows results of the measurement.

TABLE 1

| | Laminated separator | | | Electrode | | Battery Charging characteristic Charge capacity after high-rate discharge (mAh) |
|---|---|---|---|---|---|---|
| | Porous film | | Porous | Positive electrode | Negative electrode | |
| | Piercing strength (gf/(g/m$^2$)) | \|1 − TD/MD\| | layer PVDFα ratio (mol %) | plate Capacitance (nF) | plate Capacitance (nF) | |
| Ex. 1 | 52.5 | 0.42 | 35.3 | 2.1 | 4.7 | 12.4 |
| Ex. 2 | 64.1 | 0.37 | 44.4 | 2.1 | 4.7 | 11.0 |
| Ex. 3 | 64.1 | 0.37 | 44.4 | 60 | 4.7 | 10.7 |
| Ex. 4 | 64.1 | 0.37 | 44.4 | 935 | 4.7 | 11.8 |
| Ex. 5 | 64.1 | 0.37 | 44.4 | 2.1 | 274 | 11.3 |
| Ex. 6 | 64.1 | 0.37 | 44.4 | 2.1 | 7400 | 10.9 |
| Ex. 7 | 64.1 | 0.37 | 64.3 | 2.1 | 4.7 | 11.3 |
| Comp. Ex. 1 | 64.1 | 0.37 | 44.4 | 4090 | 4.7 | 6.4 |
| Comp. Ex. 2 | 64.1 | 0.37 | 44.4 | 2.1 | 9050 | 4.9 |
| Comp. Ex. 3 | 64.1 | 0.37 | 34.6 | 2.1 | 4.7 | 5.2 |

*"Ex." stands for "Example", and "Comp. Ex." stands for "Comparative Example."

Table 1 shows that, as compared with the nonaqueous electrolyte secondary battery produced in each of Comparative Examples 1 to 3, the nonaqueous electrolyte secondary battery produced in each of Examples 1 to 7 had a more excellent charge capacity characteristic after high-rate discharge.

This reveals that a nonaqueous electrolyte secondary battery which satisfies the four requirements described earlier in <Method for producing nonaqueous electrolyte secondary battery> can have an enhanced charge capacity characteristic after high-rate discharge.

INDUSTRIAL APPLICABILITY

A nonaqueous electrolyte secondary battery in accordance with an embodiment of the present invention is excellent in charge capacity characteristic after high-rate discharge. Thus, the nonaqueous electrolyte secondary battery in accordance with an embodiment of the present invention can be suitably used as a battery for, for example, any of a personal computer, a mobile telephone, a portable information terminal, and a vehicle.

REFERENCE SIGNS LIST

1 Diamond indenter
2 Substrate
3 Porous film

The invention claimed is:

1. A nonaqueous electrolyte secondary battery comprising:
   a nonaqueous electrolyte secondary battery separator including a polyolefin porous film;
   a porous layer containing a polyvinylidene fluoride-based resin;
   a positive electrode plate having a capacitance of not less than 1 nF and not more than 1000 nF per measurement area of 900 mm$^2$; and
   a negative electrode plate having a capacitance of not less than 4 nF and not more than 8500 nF per measurement area of 900 mm$^2$,
   the polyolefin porous film having a piercing strength of not less than 26.0 gf/g/m$^2$, the piercing strength being measured with respect to a weight per unit area of the polyolefin porous film,
   the polyolefin porous film having a value in a range of 0.00 to 0.54, the value being represented by the following Expression (1):

$$|1-T/M| \qquad (1)$$

where T represents a distance at which a critical load is reached in a scratch test in which the polyolefin porous film is moved in a transverse direction under a constant load of 0.1 N, and M represents a distance at which a critical load is reached in a scratch test in which the polyolefin porous film is moved in a machine direction under a constant load of 0.1 N,
   the porous layer being provided between the nonaqueous electrolyte secondary battery separator and at least one of the positive electrode plate and the negative electrode plate, and
   the polyvinylidene fluoride-based resin containing an α-form polyvinylidene fluoride-based resin in an amount of not less than 35.0 mol % with respect to 100 mol % of a total amount of the α-form polyvinylidene fluoride-based resin and a β-form polyvinylidene fluoride-based resin contained in the polyvinylidene fluoride-based resin,
   where the amount of the α-form polyvinylidene fluoride-based resin contained is calculated from waveform separation of (α/2) observed at around −78 ppm in a $^{19}$F-NMR spectrum obtained from the porous layer, and waveform separation of {(α/2)+β} observed at around −95 ppm in the $^{19}$F-MMR spectrum obtained from the porous layer.

2. The nonaqueous electrolyte secondary battery as set forth in claim 1, wherein the positive electrode plate contains a transition metal oxide.

3. The nonaqueous electrolyte secondary battery as set forth in claim 1, wherein the negative electrode plate contains graphite.

4. The nonaqueous electrolyte secondary battery as set forth in claim 1, further comprising:
   another porous layer which is provided between (i) the nonaqueous electrolyte secondary battery separator and (ii) at least one of the positive electrode plate and the negative electrode plate.

5. The nonaqueous electrolyte secondary battery as set forth in claim 4, wherein the another porous layer contains at least one resin selected from the group consisting of a polyolefin, an acrylate-based resin, a meth acrylate-based resin, a fluorine-containing resin excluding a polyvinylidene fluoride-based resin, a polyamide-based resin, a polyester-based resin, and a water-soluble polymer.

6. The nonaqueous electrolyte secondary battery as set forth in claim 5, wherein the polyamide-based resin is an aramid resin.

* * * * *